(12) United States Patent
Tolan et al.

(10) Patent No.: US 8,082,637 B2
(45) Date of Patent: Dec. 27, 2011

(54) LOW PROFILE TOUCH FASTENER

(75) Inventors: Nancy J. Tolan, Derry, NH (US); Mark A. Clarner, Concord, NH (US); William B. S. Mc Dougall, Concord, NH (US); Normand A. Cote, Bedford, NH (US); Howard A. Kingsford, Amherst, NH (US); Paul R. Erickson, New Boston, NH (US); Clinton Dowd, Goffstown, NH (US)

(73) Assignee: Velcro Industries B.V., Curacao ( * ) Notice: Subject to any disclaimer, the term of this patent is extended or adjusted under 35 U.S.C. 154(b) by 1966 days.

(21) Appl. No.: 10/688,032

(22) Filed: Oct. 15, 2003

(65) Prior Publication Data

US 2005/0081345 A1 Apr. 21, 2005

(51) Int. Cl.
*A44B 18/00* (2006.01)
(52) U.S. Cl. .............................. 24/452; 24/446; 24/450
(58) Field of Classification Search ............ 24/442–452, 24/306; 428/99, 100
See application file for complete search history.

(56) References Cited

U.S. PATENT DOCUMENTS

| | | | |
|---|---|---|---|
| 3,387,345 A | 6/1968 | Savoir | 24/446 |
| 3,426,363 A | 2/1969 | Girard | 2/338 |
| 3,594,873 A | 7/1971 | Hockmeyer, Jr. et al. | 24/445 |
| 3,900,652 A | 8/1975 | Uraya et al. | 428/92 |
| 4,035,880 A | 7/1977 | Hills et al. | 28/220 |
| 4,165,555 A | 8/1979 | Boxer et al. | 24/444 |
| 4,402,690 A | 9/1983 | Redfern | 604/391 |
| 4,410,327 A | 10/1983 | Baggaley | 604/391 |
| 4,870,725 A | 10/1989 | Dubowik | 24/442 |
| 4,894,060 A * | 1/1990 | Nestegard | 24/442 |
| 4,973,326 A * | 11/1990 | Wood et al. | 24/450 |
| 4,984,339 A | 1/1991 | Provost et al. | 24/452 |
| 5,176,670 A | 1/1993 | Roessler et al. | 604/391 |
| 5,318,741 A | 6/1994 | Thomas | 264/519 |
| 5,325,569 A | 7/1994 | Goulait et al. | 24/448 |
| 5,326,415 A | 7/1994 | Thomas et al. | 156/244.11 |
| 5,326,612 A | 7/1994 | Goulait | 428/100 |
| 5,368,549 A | 11/1994 | McVicker | 602/6 |
| 5,369,852 A | 12/1994 | Higashinaka | 24/446 |
| 5,369,853 A | 12/1994 | Okawa et al. | 24/446 |
| 5,392,498 A | 2/1995 | Goulait et al. | 24/452 |
| 5,399,177 A | 3/1995 | Blaney et al. | 604/389 |
| 5,399,418 A | 3/1995 | Hartmanns et al. | 428/218 |
| 5,417,902 A | 5/1995 | Bennie et al. | 264/103 |
| 5,466,410 A | 11/1995 | Hills | 264/172.11 |
| 5,473,800 A | 12/1995 | Hatomoto et al. | 24/442 |
| 5,476,702 A | 12/1995 | Datta et al. | 428/99 |
| 5,540,673 A | 7/1996 | Thomas et al. | 604/391 |
| 5,542,942 A | 8/1996 | Kline et al. | 604/385.29 |
| 5,595,567 A | 1/1997 | King et al. | 375/346 |
| 5,607,345 A | 3/1997 | Barry et al. | 451/539 |

(Continued)

FOREIGN PATENT DOCUMENTS

EP 0 765 616 4/1997

(Continued)

*Primary Examiner* — Victor Batson
(74) *Attorney, Agent, or Firm* — Fish & Richardson P.C.

(57) ABSTRACT

A releasable touch fastener includes a loop component and a hook component, with a particularly small overall engaged thickness in combination with a high fastening strength, both in peel and shear. The loop component is a woven material, while the hook component may be woven or molded. The molded hook component includes a scrim reinforcement for tear resistance and sewability. The fastener is useful for high cycle applications, such as on non-disposable garments, footwear and luggage.

53 Claims, 21 Drawing Sheets

U.S. PATENT DOCUMENTS

| | | | |
|---|---|---|---|
| 5,615,460 A | 4/1997 | Weirich et al. | 24/446 |
| 5,620,769 A * | 4/1997 | Wessels et al. | 24/452 |
| 5,636,414 A | 6/1997 | Litchholt et al. | 24/304 |
| 5,655,268 A | 8/1997 | Keyaki et al. | 24/114.9 |
| 5,669,120 A | 9/1997 | Wessels et al. | 24/446 |
| 5,699,593 A | 12/1997 | Jackson | 24/445 |
| 5,702,797 A * | 12/1997 | Sakakibara et al. | 24/452 |
| 5,800,920 A | 9/1998 | Umezawa et al. | 428/364 |
| 5,845,375 A | 12/1998 | Miller et al. | 24/452 |
| 5,974,635 A | 11/1999 | Murasaki | 24/446 |
| 6,039,911 A | 3/2000 | Miller et al. | 264/280 |
| 6,131,251 A | 10/2000 | Provost | 24/452 |
| 6,163,939 A | 12/2000 | Lacey et al. | 24/452 |
| 6,248,419 B1 * | 6/2001 | Kennedy et al. | 24/452 |
| 6,851,161 B2 * | 2/2005 | Kingsford et al. | 24/452 |
| 2002/0042601 A1 * | 4/2002 | Martin et al. | 24/442 |
| 2003/0121128 A1 * | 7/2003 | Vanbenschoten et al. | 24/452 |

FOREIGN PATENT DOCUMENTS

| | | |
|---|---|---|
| GB | 2 056 477 | 3/1981 |

* cited by examiner

LOW PROFILE TOUCH FASTENER

TECHNICAL FIELD

This invention relates to touch fasteners, such as hook and loop fasteners.

BACKGROUND

Early touch fastener products were generally woven materials, with hooks formed by cut filament loops, and loops formed by uncut filaments of a mating woven component. More recently, arrays of very small male touch fastener elements have been formed by molding the fastener elements, or at least the stems of the elements, of resin forming an interconnecting sheet of material, while low cost, non-woven or knit loop components have displaced traditional woven loop fabrics in many applications.

Although known for their strength, longevity and sewability, woven fastener products can be thicker and more expensive than some molded and non-woven counterparts of lesser fastening strength and/or longevity.

Further improvements in touch fastener closures are desired, particularly improvements that provide closures that can meet the requirements of many non-disposable and high strength applications, but at lower cost and bulk.

SUMMARY

Several aspects of the invention feature relatively strong touch fasteners with particularly low overall thickness as engaged.

According to one aspect of the invention, a releasable touch fastener includes a loop component having a sheet-form loop base and an array of female fastener elements extending from the loop base, and a hook component having a sheet-form hook base and an array of male fastener elements extending from the base and configured to releasably engage the female fastener elements of the loop component. The touch fastener has an Engaged Thickness (as defined below with respect to the disclosed test method) of less than about 0.11 inch. Furthermore, the hook and loop components are configured so as to provide a Final Peel Resistance (as defined below with respect to the disclosed test method) of at least 0.3 pound per inch of closure width.

Preferably, the hook and loop components are also configured to provide an Initial Peel Resistance (as defined below with respect to the disclosed test method) of at least 0.5 pound per inch of closure width.

The hook and loop components are preferably also configured so as to provide an Initial Shear Resistance (as defined below with respect to the disclosed test method) of at least 10 pounds per square inch.

In preferred constructions, the hook component has a Stitch Hole Tear Strength (as defined below with respect to the disclosed test method) of at least 2.0 pounds, making the closure more useful for applications where it is to be sewn onto a substrate, for example. In some cases, the hook base includes a sheet of resin, the male fastener elements have stems extending contiguously from the sheet of resin, and the Stitch Hole Tear Strength is at least 5.0 pounds. In some embodiments, the hook base includes a fabric backing laminated to a side of the hook base opposite the fastener elements. Some male fastener elements have molded crooks, in some cases each male fastener element having two crooks extending in opposite directions along the hook base.

The fastener elements are preferably arranged in a density of at least 350 fastener elements per square inch of the base.

In some constructions, the stems of the fastener elements have opposing surfaces defined by severed resin.

In some embodiments, the loop component includes, or is in the form of, a woven fabric. In some configurations, a woven loop component is paired with a hook component having a hook base including a sheet of resin, with the male fastener elements having stems extending contiguously from the sheet of resin.

Preferably, the Engaged Thickness is less than 0.10 inch, more preferably less than 0.09 inch, and even more preferably less than 0.08 inch for particularly thin closures.

Preferably, the Final Peel Resistance is at least 0.4 pound per inch of closure width, more preferably at least 0.5 pound per inch of closure width.

According to another aspect of the invention, a releasable touch fastener includes a loop component having a sheet-form loop base and an array of female fastener elements extending from the loop base, and a hook component having a sheet-form hook base and an array of male fastener elements extending from the base and configured to releasably engage the female fastener elements of the loop component. The touch fastener has an Engaged Thickness (as defined below with respect to the disclosed test method) of less than about 0.11 inch. Furthermore, the hook and loop components are configured so as to provide a an Initial Peel Resistance (as defined below with respect to the disclosed test method) of at least 0.5 pounds per inch of closure width.

The hook and loop components are preferably also configured so as to provide an Initial Shear Resistance (as defined below with respect to the disclosed test method) of at least 10 pounds per square inch.

In preferred constructions, the hook component has a Stitch Hole Tear Strength (as defined below with respect to the disclosed test method) of at least 2.0 pounds, making the closure more useful for applications where it is to be sewn onto a substrate, for example. In some cases, the hook base includes a sheet of resin, the male fastener elements have stems extending contiguously from the sheet of resin, and the Stitch Hole Tear Strength is at least 5.0 pounds. In some embodiments, the hook base includes a fabric backing laminated to a side of the hook base opposite the fastener elements. Some male fastener elements have molded crooks, in some cases each male fastener element having two crooks extending in opposite directions along the hook base.

The fastener elements are preferably arranged in a density of at least 350 fastener elements per square inch of the base.

In some constructions, the stems of the fastener elements have opposing surfaces defined by severed resin.

In some embodiments, the loop component includes, or is in the form of, a woven fabric. In some configurations, a woven loop component is paired with a hook component having a hook base including a sheet of resin, with the male fastener elements having stems extending contiguously from the sheet of resin.

Preferably, the Engaged Thickness is less than 0.10 inch, more preferably less than 0.09 inch, and even more preferably less than 0.08 inch for particularly thin closures.

Preferably, the Initial Peel Resistance is at least 0.6 pound per inch of closure width, more preferably at least 0.69 pound per inch of closure width, and even more preferably, at least 0.8 pound per inch of closure width.

According to another aspect of the invention, a releasable touch fastener includes a loop component having a sheet-form loop base and an array of female fastener elements extending from the loop base, and a hook component having a sheet-form hook base and an array of male fastener elements extending from the base and configured to releasably engage the female fastener elements of the loop component. The touch fastener has an Engaged Thickness (as defined below with respect to the disclosed test method) of less than about 0.11 inch. Furthermore, the hook and loop components are configured so as to provide a an Initial Shear Resistance (as defined below with respect to the disclosed test method) of at least 10 pounds per square inch.

In preferred constructions, the hook component has a Stitch Hole Tear Strength (as defined below with respect to the disclosed test method) of at least 2.0 pounds, making the closure more useful for applications where it is to be sewn onto a substrate, for example. In some cases, the hook base includes a sheet of resin, the male fastener elements have stems extending contiguously from the sheet of resin, and the Stitch Hole Tear Strength is at least 5.0 pounds. In some embodiments, the hook base includes a fabric backing laminated to a side of the hook base opposite the fastener elements. Some male fastener elements have molded crooks, in some cases each male fastener element having two crooks extending in opposite directions along the hook base.

The fastener elements are preferably arranged in a density of at least 350 fastener elements per square inch of the base.

In some constructions, the stems of the fastener elements have opposing surfaces defined by severed resin.

In some embodiments, the loop component includes, or is in the form of, a woven fabric. In some configurations, a woven loop component is paired with a hook component having a hook base including a sheet of resin, with the male fastener elements having stems extending contiguously from the sheet of resin.

Preferably, the Engaged Thickness is less than 0.10 inch, more preferably less than 0.09 inch, and even more preferably less than 0.08 inch for particularly thin closures.

Preferably, the Initial Shear Resistance is at least 15 pounds per square inch, more preferably at least 20 pounds per square inch, and for resisting particularly high shear loads, at least 25 pounds per square inch.

Other aspects of the invention feature methods of employing the above-described closures to releasably secure two surfaces together, such as flexible surfaces of fabric.

The closures provided by the invention disclosed herein can be particularly useful for applications requiring high closure strength and low closure thickness. Closure strengths of a magnitude commonly associated with thicker, more bulky woven fastener tapes can be provided at lower cost and overall thickness, even for high cycle applications such as non-disposable garments, outerwear, footwear, luggage and the like. In particular, at least some examples include an inexpensive molded hook component configured to withstand high cycles when stitched onto a substrate, without tearing. The closures are readily and efficiently manufacturable by modifications to known manufacturing methods.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
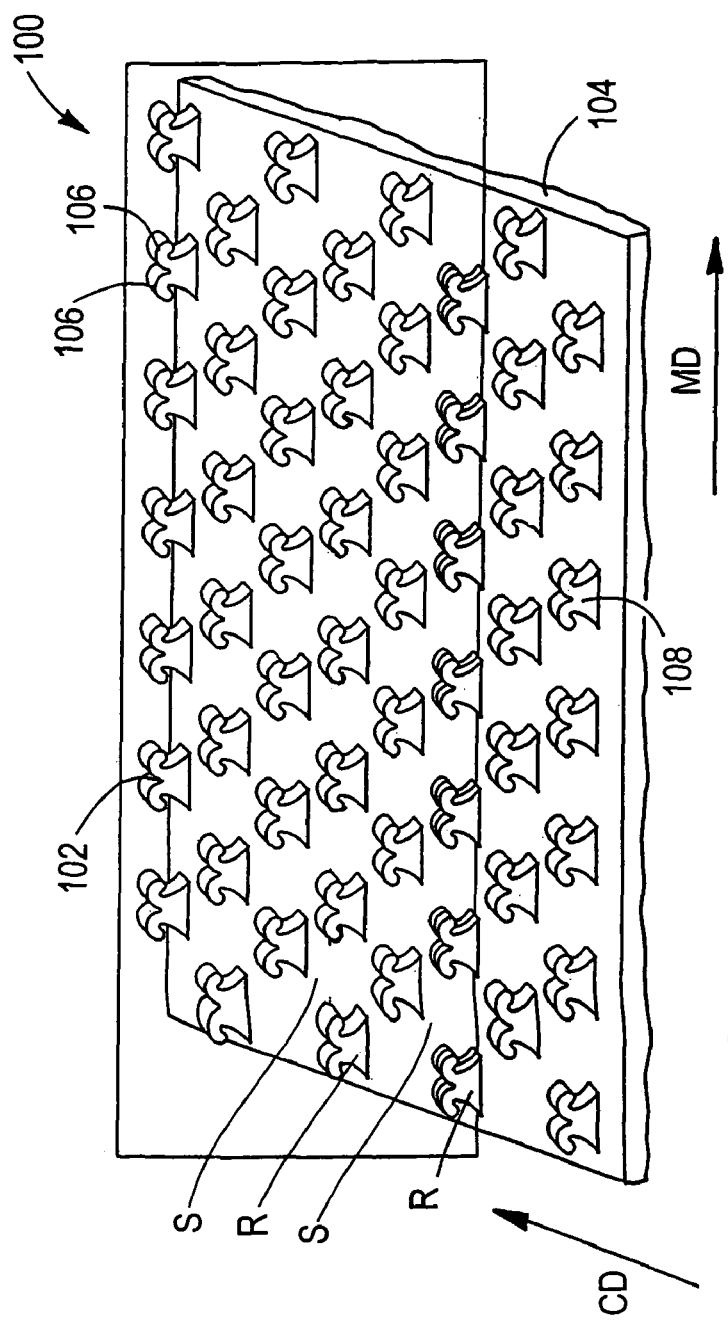
FIG. 1 is a perspective view of male fastener component with palm tree-shaped hooks.
Figure 2:
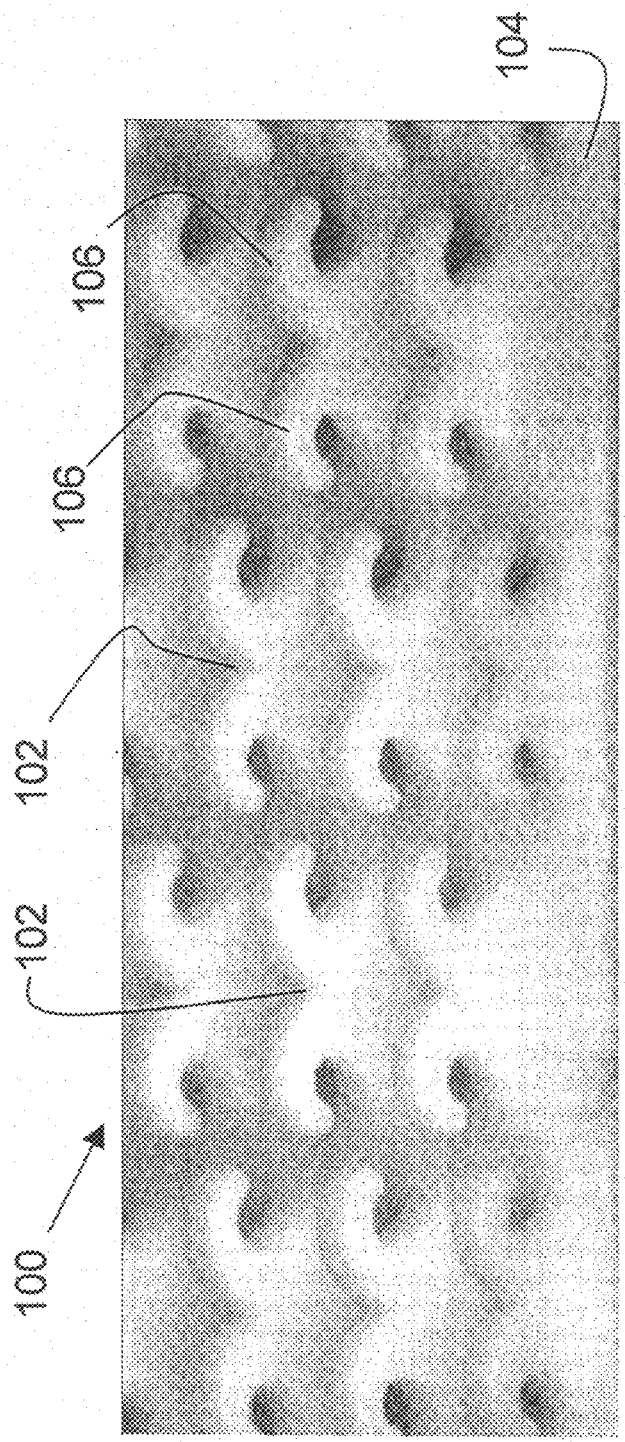
FIG. 2 is an enlarged photograph of an example of the fastener of FIG. 1.

Referring to FIGS. 1 and 2, a male touch fastener component 100 includes a field of fastener elements 102 arranged in rows R extending outwardly from and integrally with a sheet-form base 104. Spacing S between rows may be controlled by the manufacturing process and will be discussed further below. Fastener elements 102 are palm tree-shaped hooks and are engageable in two directions along a plane (i.e., an engagement plane) perpendicular to sheet-form base 104 in the direction of rows R. Each fastener element 102 includes two heads 106 extending from a single stem 108.

Male fastener component 100 is designed to, for example, strongly engage a low pile height, loop touch fastener component, particularly a loop component with loops formed of, for example, a high strength multifilament yarn or a high strength monofilament. High strength loops are desirable for fasteners for high strength applications requiring high cycle life, as the resist breakage at higher peel loads. Typically, high strength yarns and monofilaments are made by extrusion. Generally, the process includes a drawdown step to impart orientation on the yarn or monofilament so as to improve, for example, tenacity of the yarn or monofilament. High strength fibers may also be formed by other methods, for example, by solution spinning. Suitable high strength loop filament materials include, for example, polyamides, polyesters, polyurethanes, ultra-high molecular weight solution spun polyethylene (e.g., SPECTRA® polyethylene), aramids (e.g., KEVLAR®), acrylics and rigid rod polymers like poly(p-phenylene-2,6-benzobisoxazole).

Figure 3:
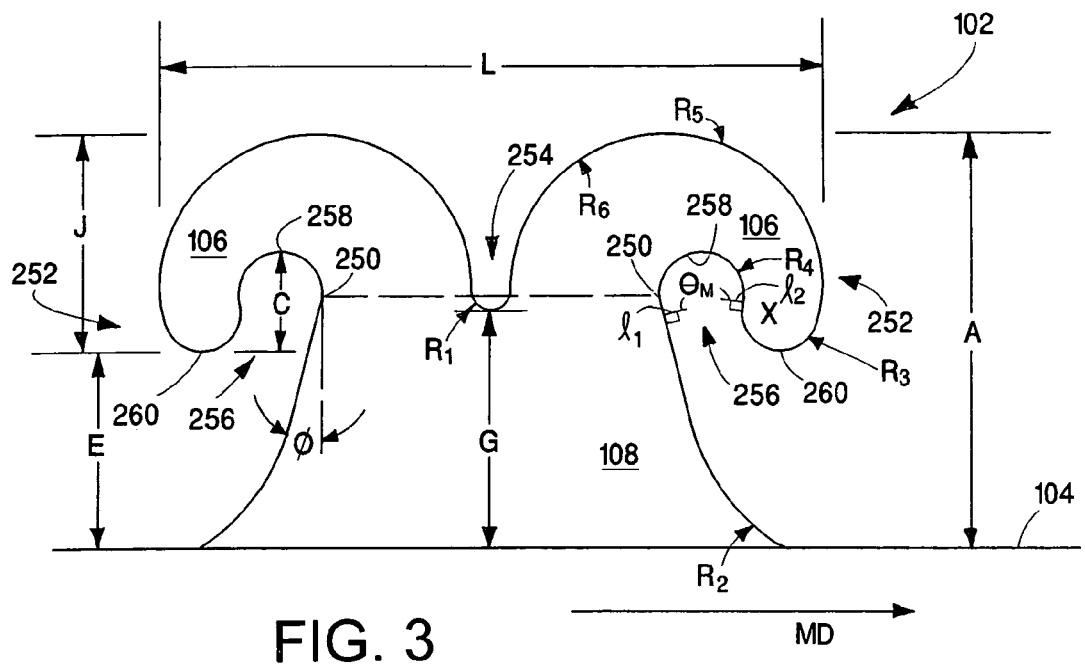
FIG. 3 is an enlarged side view of one of the fastener elements.
Figure 3A:
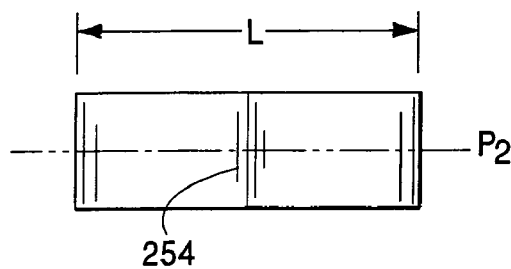
FIGS. 3A and 3B are top and end views, respectively, of the fastener element of FIG. 3.
Figure 3B:
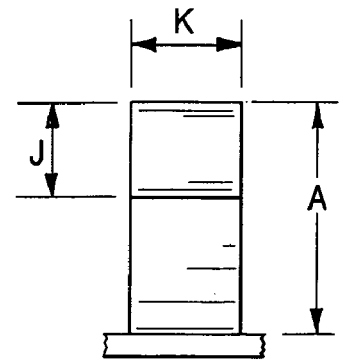

Referring now to FIGS. 3, 3A and 3B, fastener element 102 has a substantially constant thickness from base to tip, and includes a stem 108 extending outwardly from and molded integrally with sheet-form base 104. For purposes of the present disclosure, we refer to the stem 108 as beginning at the upper surface of base 104 and ending at an elevation where the inner crook surface is perpendicular to the base, an elevation 250 above which the inner crook surface begins to overhang the stem 108 or sheet-form base. Fastener element 102 also includes two heads 106 extending in essentially opposite directions in an engagement plane. Heads 106 extend from distal end 250 of the stem to corresponding, oppositely-directed tips 252. Thus, fastener element 102 is an example of what is known in the art as a 'palm-tree' fastener element. The heads 106 have upper surfaces that alone or together with the stem define a well 254 between the heads. Each head 106 has a lower surface that rises up through an apex 258 and then falls again, forming an arched crook 256 for retaining loops of a mating female touch fastener component.

The overall height A of fastener element 102 is measured in side view perpendicular to sheet-form base 104 from the top of the sheet-form base. Under crook height C is the distance measured in side view, perpendicular to the sheet-form base, between the lowermost extent of the tip 260 and the apex 258 of the crook. Entrance height E is the distance measured in side view, perpendicular to the sheet-form base, from the top of the sheet-form base to the lowermost extent of tip 260. If part of the stem is directly below the lowermost extent of the tip 260, then the distance is measured from that portion of the stem directly below to the lowermost extent of the tip 260. Head height J of fastener element 102 is measured perpendicular to sheet-form base 104 from the lowermost extent of tip 260 to the highest elevation of the head 106 above the base. In general, J will be the difference between A and E. Well height G is measured in side view from the lower extent of stem 108 to the lower extent of well 256 defined in the upper surface of the fastener element between the heads.

Width L of the fastener element is measured in side view and is the maximum lateral extent of the fastener element heads 106 as measured parallel to the sheet-form base. Hook thickness K is the overall thickness of the fastener element, taken at elevation 250 corresponding to the upper end of stem 108. In most cases other than instances where the heads have been formed subsequent to stem molding, the heads will lie completely within this hook thickness K. In the example shown, hook thickness is the same at all elevations. The product of head width L and thickness K we call the footprint of the fastener element, and is related to the area of contact between the hook product and a mating loop product during initial engagement, although it will be understood to not be an exact measure of such contact area. The product of footprint and head height J (i.e., K×L×J) we refer to as displacement volume. For a more detailed explanation of the relevance of hook volume to fastener performance, see Provost, U.S. Pat. No. 5,315,740, the contents of which are incorporated herein by reference.

The front and rear surfaces of the stem define, in side profile, inclination angles $\phi$ of about 23 degrees with respect to vertical, with the width of the stem tapering to narrower away from the base, both for strength and ease of molding.

Under crook angle $\theta_m$ is an angle defined in the crook by inner surfaces of the head and stem, between a pair of line segments perpendicular to facing surfaces of the fastener element, in side view. Line segment $l_1$ is perpendicular to the forward edge of stem 108 at the elevation of the distal tip 260 of the head. Line segment $l_2$ is perpendicular to the under crook surface of the head at a point of inflection 'X' of the under head surface. In cases where there is not a smooth curvature transition inside the tip, such as where the underside of the head forms a sharp corner adjacent the tip, line segment $l_2$ should be taken as perpendicular to the underside surface of the head just above such a corner or discontinuity. As shown, angle $\theta_m$ is measured from the upper side of line segment $l_1$, about the crook, to the upper side of line segment $l_2$. For this illustrated example, $\theta_m$ is 201 degrees.

The linear and radial dimensions of the example illustrated in FIGS. 3, 3A and 3B are as follows:

| Dimension | Inches | Millimeters |
| --- | --- | --- |
| A | 0.025 | 0.635 |
| C | 0.0064 | 0.163 |
| E | 0.0105 | 0.267 |
| G | 0.0122 | 0.310 |
| J | 0.0145 | 0.368 |
| K | 0.012 | 0.305 |
| L | 0.0497 | 1.262 |
| $R_1$ | 0.0011 | 0.279 |
| $R_2$ | 0.0090 | 0.229 |
| $R_3$ | 0.0026 | 0.0660 |
| $R_4$ | 0.0040 | 0.102 |
| $R_5$ | 0.0107 | 0.272 |
| $R_6$ | 0.0164 | 0.417 |

These values result in a footprint of $5.96 \times 10^{-4}$ square inches (0.00385 cm$^2$), and a displacement volume of about $8.65 \times 10^{-6}$ cubic inches (0.000142 cm$^3$). Given a hook density of 380 fastener elements per square inch, the overall fastener component has an overall hook footprint of 22.6 percent of the overall array area.

Further details of the embodiment of FIG. 3 can be found in an application entitled "MULTIPLE-CROOK MALE TOUCH FASTENER ELEMENTS," filed concurrently herewith and assigned U.S. Ser. No. 10/688,320, the disclosure of which is hereby incorporated in full by reference.

Some examples have varying thickness, and non-planar sides. For example, the fastener element 102a of FIGS. 4, 4A and 4B has a greatest thickness at its base, and tapers in thickness to the distal tips of the heads. However, as seen in side view, fastener element 102a has the same profile as shown in FIG. 3, and approximately the same dimensions listed above also apply to this example.

Not all palm-tree fastener elements have two identical crooks. For example, some palm-tree fastener elements are intentionally formed to have one head extending up higher than the other, such as to engage loops of differing heights. Also, some palm-tree hooks are molded to have two identical crooks, but later processing alters one crook more than the other, such as discussed below.

Not all examples are of the 'palm-tree' variety. For example, the fastener element 302 of FIG. 5 defines only a single crook, and is thus an example of a 'J-hook' fastener element. In this case, head width L is taken from the forward-most edge of the hook head 306 to the rearmost extent of the hook stem 308. Otherwise, with the exception of well height G as inapplicable to J-hooks, the dimensions provided above with respect to FIG. 3 apply equally to the J-hook of FIG. 5. Fastener elements 302 can be arranged in rows extending from a sheet-form base 304, with hooks of adjacent rows facing in opposite directions. Other arrangements of such hooks are also envisioned.

Figure 5:
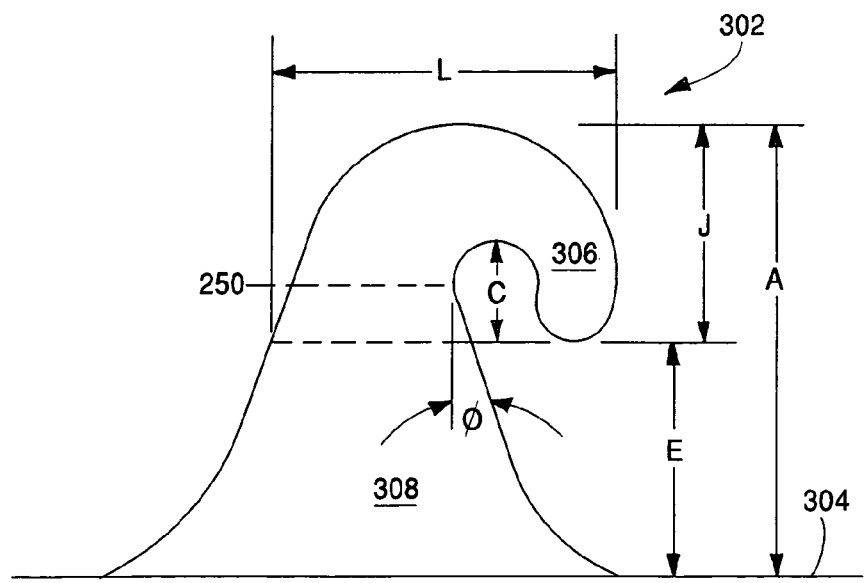
FIG. 5 is an enlarged side view of a J-hook fastener element.
Figure 4:
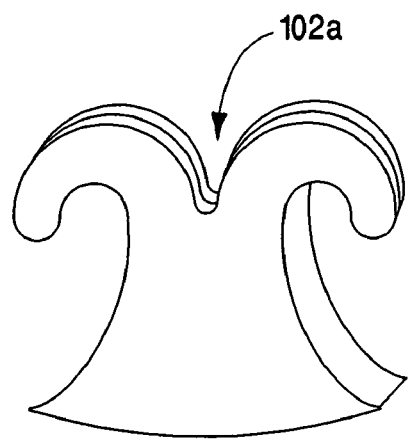
FIG. 4 is a perspective view of an alternate palm tree hook shape.
Figure 4A:
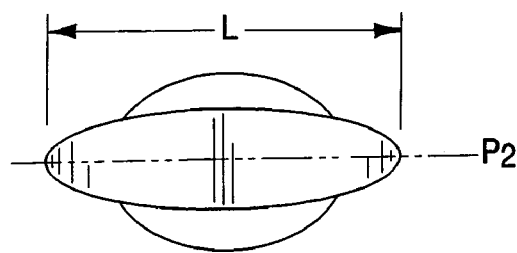
FIGS. 4A and 4B are top and end views, respectively, of the fastener element of FIG. 4.
Figure 6:
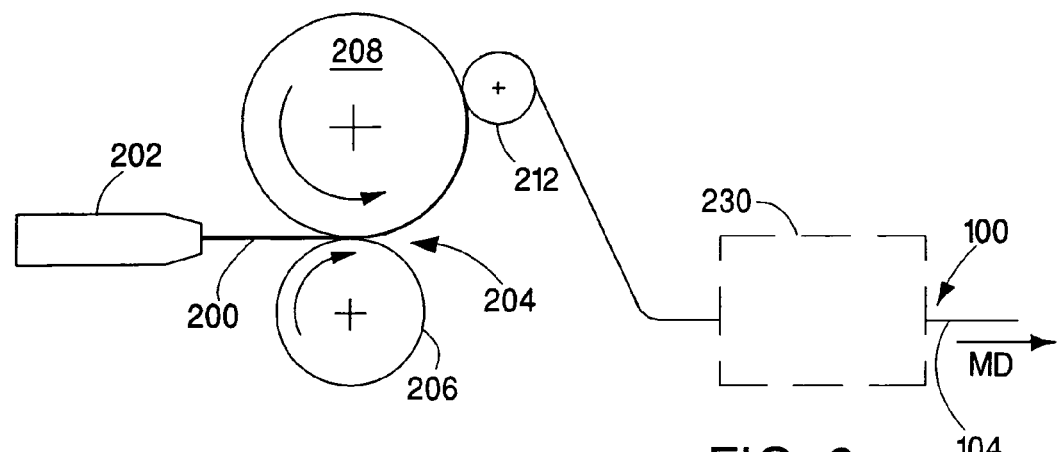
FIGS. 6 and 6A illustrate alternate molding processes for forming the fastener components.

The fastener elements of FIGS. 3-5 can be molded in the shapes shown. Referring to FIG. 6, thermoplastic resin 200 is extruded as a molten sheet from extruder 202 and introduced into nip 204 formed between a pressure roll 206 and a counter-rotating mold roll 208 defining fastener element-shaped cavities in its surface. Pressure in the nip causes thermoplastic resin 200 to enter these blind-ended forming cavities to form the fastener elements, while excess resin remains about the periphery of the mold roll and is molded between the rolls to form sheet-form base 104. The thermoplastic resin is cooled as it proceeds along the periphery of the mold roll, solidifying the fastener elements, until it is stripped by stripper roll 212. The molded fastener elements distend during de-molding, but tend to recover substantially their as-molded shape. It is generally understood that fastener element crooks molded to face downstream tend to distend slightly more than those molded to face upstream, and can remain more distended in the final product. The direction of travel of the material illustrated in FIG. 6 is referred to as the "machine direction" (MD) of the material and defines the longitudinal direction of the resulting product, while the cross-machine direction (CD) is perpendicular to the machine direction within the plane of the sheet-form base. Further details regarding processing are described by Fischer, U.S. Pat. No. 4,775,310 and Clune et al., U.S. Pat. No. 6,202,260, the disclosures of which are hereby incorporated in full by reference.

In some embodiments, the mold roll 208 comprises a face-to-face assembly of thin, circular plates or rings (not shown) that are, for example, about 0.003 inch to about 0.250 inch (0.0762 mm-6.35 mm) thick, some having cutouts in their periphery defining mold cavities and others having solid circumferences, serving to close the open sides of the mold cavities and serve as spacers, defining the spacing between adjacent fastener element rows. A fully "built up" mold roll may have a width, for example, from about 0.75 inch to about 6 inches (1.91 cm-15.24 cm) or more and may contain, for example, from about 50 to 1000 or more individual rings. Further details regarding mold tooling are described by Fisher, U.S. Pat. No. 4,775,310. Additional tooling embodiments will also be described below.

The cavities that made the fastener element shown in FIG. 3-3B have sharp edges and straight sidewalls and create fastener elements with substantially similar cross-sections through the thickness of the fastener element. Tooling with straight sidewalls and edges can be made by, for example, laser cutting, wire EDM or electroforming. Further details regarding laser cutting and wire EDM mold tooling is described by Fisher, U.S. Pat. No. 4,775,310. The electroforming process is described by Clarner et al., U.S. Ser. No. 10/455,240, the disclosure of which is hereby incorporated in full by reference.

Figure 4B:
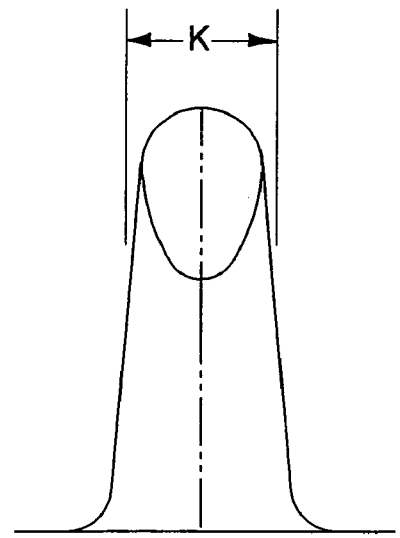

By contrast, fastener elements formed in cavities that have been, for example, photochemically etched may have rounded surfaces in some or all regions, from base to tip, such as those illustrated in FIGS. 4-4B. For example, surfaces at the top of the heads can be made to taper to a point to give a wedge effect. A wedge-shape may, for example, assist the entry of the crook into the face of a mating female fastener component. Further details regarding photochemical etching is described in Lacey et al., U.S. Pat. No. 6,163,939, the entire disclosure of which is hereby incorporated in full by reference.

Figure 6A:
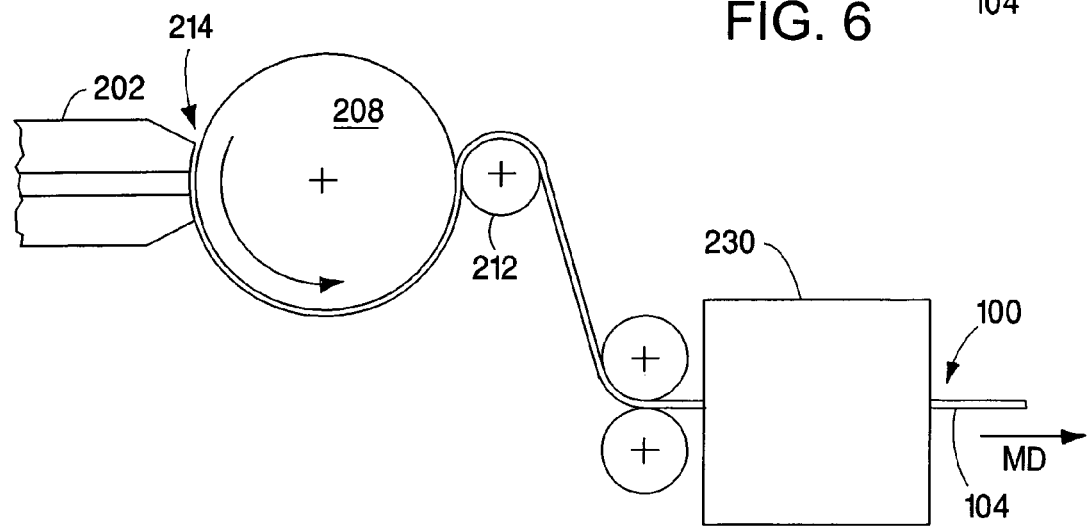

An alternate technique for molding fastener elements is shown in FIG. 6A. The process is similar to that described above with reference to FIG. 6, except only a mold roll 208 is used, i.e., no pressure roll 206 is necessary. Here, the extruder 202 is shaped to conform to the periphery of the mold roll 208 and the extruded resin 200 is introduced under pressure directly to a gap 214 formed between mold roll 208 and extruder 202. The molded fastener component is stripped from the mold cavities by a stripper roll 212 as described above. Further details regarding this process are described by Akeno, U.S. Pat. Nos. 5,781,969 and 5,913,482, the disclosures of which are hereby incorporated in full by reference.

Figure 7:
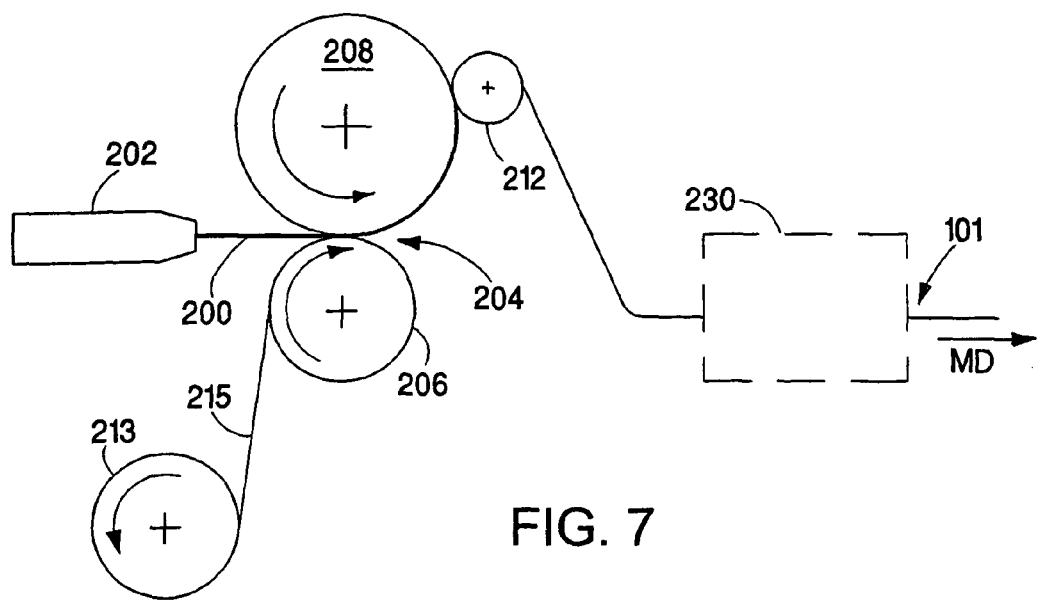
FIG. 7 illustrates a variation of the process of FIG. 6, for forming a laminated fastener.
Figure 8:
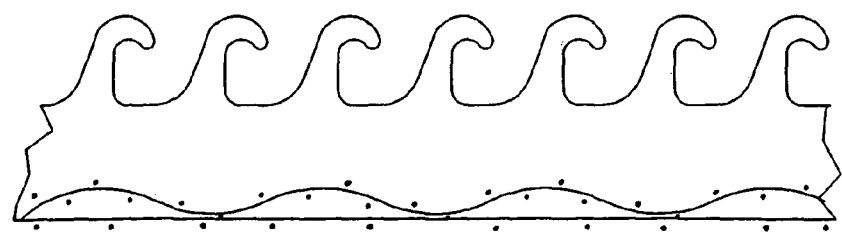
FIG. 8 is an enlarged cross-section of a product formed by the process of FIG. 7.

Referring to FIGS. 7 and 8, a laminated male touch fastener component 101 may be formed by introducing a pre-form material 215 into nip 204 between the mold and pressure rolls. As a result of the heat and pressure in nip 204, pre-form material 215 becomes laminated and bonded to the thermoplastic resin 200 simultaneously with the forming of the fastener elements. The result can be a contiguous molded structure, without weld lines, extending from the tips of the fastener elements into the pre-form material, where the resin can intimately bond with features or fibers of the material to form a strong, permanent bond. Further details regarding this process are described by Kennedy et al., U.S. Pat. No. 5,260,015, the disclosures of which is hereby incorporated in full by reference.

In one useful embodiment, pre-formed material 215 is a loose knit scrim, such as Knit 3901 from Velcro USA in Manchester, N.H., although Velcro USA loop products 3900, 3905, and 3400 may also be employed. These fabrics are 2 bar tricot knit fabrics, whose technical back sides are typically brushed or napped to raise the surface floats and create a hook-engageable loop surface. Knit 3901 is a similar 2 bar Tricot knit nylon fabric which generally must be brushed or napped before it can be employed as the functioning loop of a hook and loop closure. However, it has been found to function well as a reinforcement when at least partially encapsulated by, or bonded to, the base resin contiguous with the resin forming the hooks, without brushing or napping. Reinforcing the base with such a scrim has been found to improve the stitch tear strength of the product, providing a resin-base hook product practical for attachment by sewing or stitching.

Figure 9:
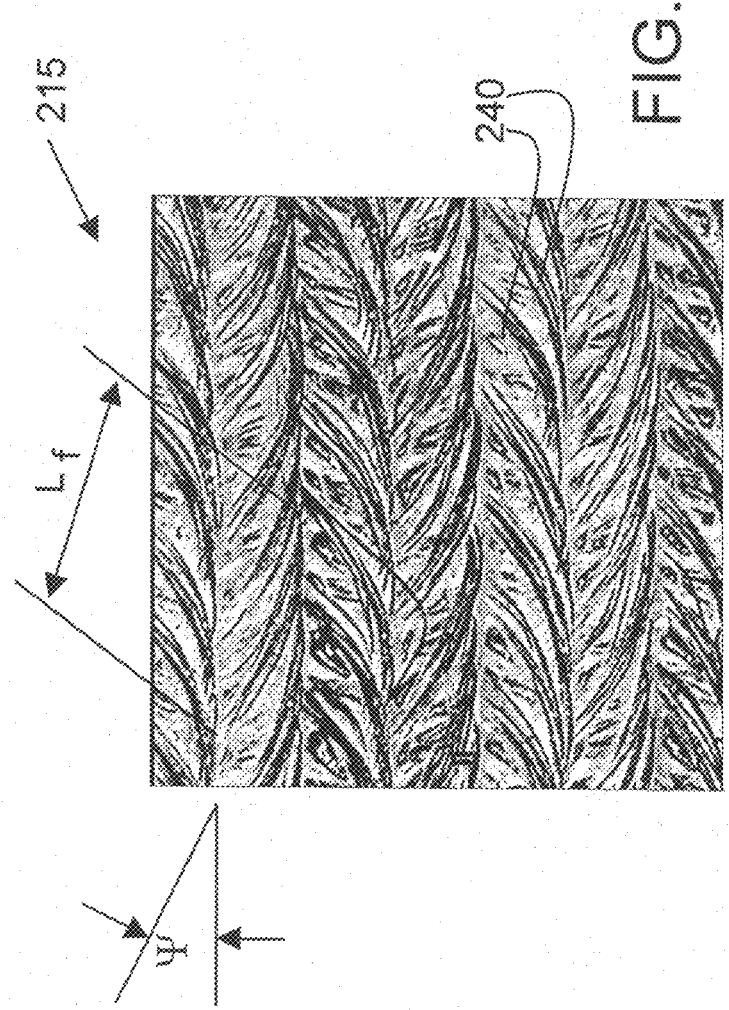
FIG. 9 is an enlarged photograph of the back surface of an example of the fastener product of FIG. 8.

FIG. 9 shows the textile appearance provided by the laminated scrim material 215. As shown, the knit scrim includes an array of exposed float segments 240 extending across the surface of the scrim, in a generally regular, herringbone pattern. If this warp knit scrim were to be employed as an engageable loop material rather than as a thin reinforcement for the hook base, these float segments would have been raised from the fabric surface to form a loop pile, such as by brushing or napping, prior to lamination. However, these float segments 215 have been intentionally left flat against the surface of the fabric for improved reinforcement against tearing, as discussed below.

Scrim 215 has two distinct layers of yarns, creating what is referred to in the textile trades as the technical face and the technical back of the fabric. The ground and top yarns of knit scrim 215 are 40 denier multifilament yarns, each yarn comprising 12 filaments. A variety of yarn deniers are available on the market. In this application deniers from 20-170, with a variety of filament counts may be used, including monofilaments. Finer denier yarns however, are preferred for creating thinner lighter weight fabrics. Each ground and top yarn filament in this example is 3.3 denier, however a variety of filament deniers could be employed ranging from micro denier to 40 denier per filament. The ground and top yarns can be of Nylon 6 or Nylon 6.6, for example, or other textile yarn materials such as polyester or polypropylene. In this example, the ground and top yarns are of regular tenacity filaments, with tenacities of approximately 4.5 grams per denier. High tenacity yarns may provide additional tear strength for more severe applications. These yarns are also considered yarns with regular elongation. High elongation yarns or even elastomeric stretch yarns such as "Spandex" or rubber may be useful for some applications.

Scrim 215 is a Tricot warp knit, but other acceptable knits may include Rachelle, Milanese, flat, or circular knits. Knits with laid in yarns may also increase tear strength. Woven or Malimo fabrics may also be employed to some advantage. Scrim 215 is fabricated on a 2 bar warp knitter, but multi bar machines, such as a 3 bar knitter could also be used. The scrim is made on a 32 gauge warp knit machine, with 32 needles per inch of fabric width, such that the product from the machine, prior to stretching or shrinking, has approximately 32 wales per inch. Similar fabrics can be made on courser gauge machines, such as 20 or 28 gauge, or finer machines, such as 36 gauge. The scrim is constructed with 47 to 55 courses (stitches) per inch, but acceptable fabrics, made by varying the courses from 20 to 60 courses per inch, can be made as needed for the application. This course count can also be varied somewhat in final finishing by compacting or stretching the fabric on a tenter frame. The scrim has about 32 to 38 wales (ends) per inch, but could be modified to contain anywhere from 15 to 60 wales per inch, by changing the machine gauge or stretching or compacting fabric width on the tenter frame. In the final product shown, there are about 185 float segments 240 per square centimeter on the back side of the fastener tape.

Figure 10:
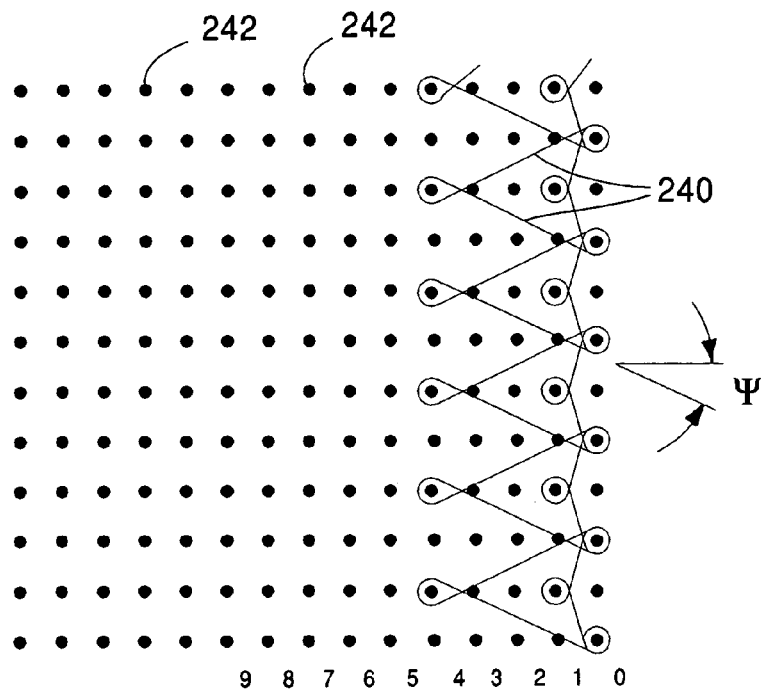
FIG. 10 illustrates a warp knit pattern.

FIG. 10 illustrates a knit pattern for a two-bar warp knit (i.e., performed on a knitting machine with two bars, known generally as Bar 1 or the back bar, and Bar 2 or the front bar), showing the float yarn segments 240. In this figure, each dot 242 represents a knitting needle. There are two chain stitches shown running down the length of the figure. One chain is from one set of yarn beams (to Bar 1), forming the ground or technical face of the fabric. Bar 1 holds all the ends from this beam on the needle bed, and traverses back and forth across two needles in a 1-0/1-2 motion. Bar 2 contains all the ends of yarn from a second set of yarn beams, which form the technical back of the fabric. With a 4-5 motion, the front needle bar traverses over 3 empty needles on every stitch. With a simple change in the stitch cam on the knit machine, this needle bar can be made to traverse over fewer needles (such as 2 empty needles in a 3-4 motion) to create a shorter float, or traverse over more than 5 needles to create a longer float. Bar 2 alternates back and forth on every stitch (envision a zigzag stitch in a sewing machine), creating floating yarn segments 240. One float segment 240 is created on every course. The more needles the bar crosses, the longer the float.

In a 3 bar knit, the third yarn could be employed to form a float pattern that overlaps the float pattern of the second yarn, such that each float segment of the final product overlaps another float segment in a direction extending across the width of the fabric (i.e., with each wale being crossed by floats of each of the second and third yarns).

The technical back of the fabric could be brushed or napped to raise the float yarns 240 from the side of the fabric and lengthen the length of the float segments, to create a pile for use as a loop fastener, but for use as a reinforcement (and to keep the product advantageously thin) we prefer to leave the float yarns lying on the surface of the fabric. Thus, the scrim is preferably unnapped, with the unnapped pile yarn from the Bar 2 top beam laying on surface of the ground fabric. The unnapped pile yarn floats back and forth across the ground fabric, which is believed to improve tear strength in the final product, particularly when exposed on the back side of the laminate and not bonded against the surface of the fabric.

Longer floats are believed to improve the tear strength more than shorter floats. The length of the float is changed by modifying the motion of Bar 2. Longer floats traverse more ends of the fabric ground, bridging potential tear lines between adjacent wales. The frequency of floats in the fabric length direction can be changed by modifying the courses per inch of fabric. Increasing the stitches per inch increases the floats per inch, and can also increase the float angle $\psi$ in relation to the wales. A float angle approaching 90 degrees is thought to provide the highest tear resistance. Decreasing the stitches per inch decreases the floats per inch. A more open knit product, with fewer stitches per inch, may have a smaller float angle, and it is thought that this construction would provide less favorable tear resistance improvement than the higher float angles. In the example shown in FIG. 9, the average float length $L_f$ is about 5 millimeters, but float lengths between about 2 and 10 millimeters are envisioned for yarns of this denier.

Figure 11:
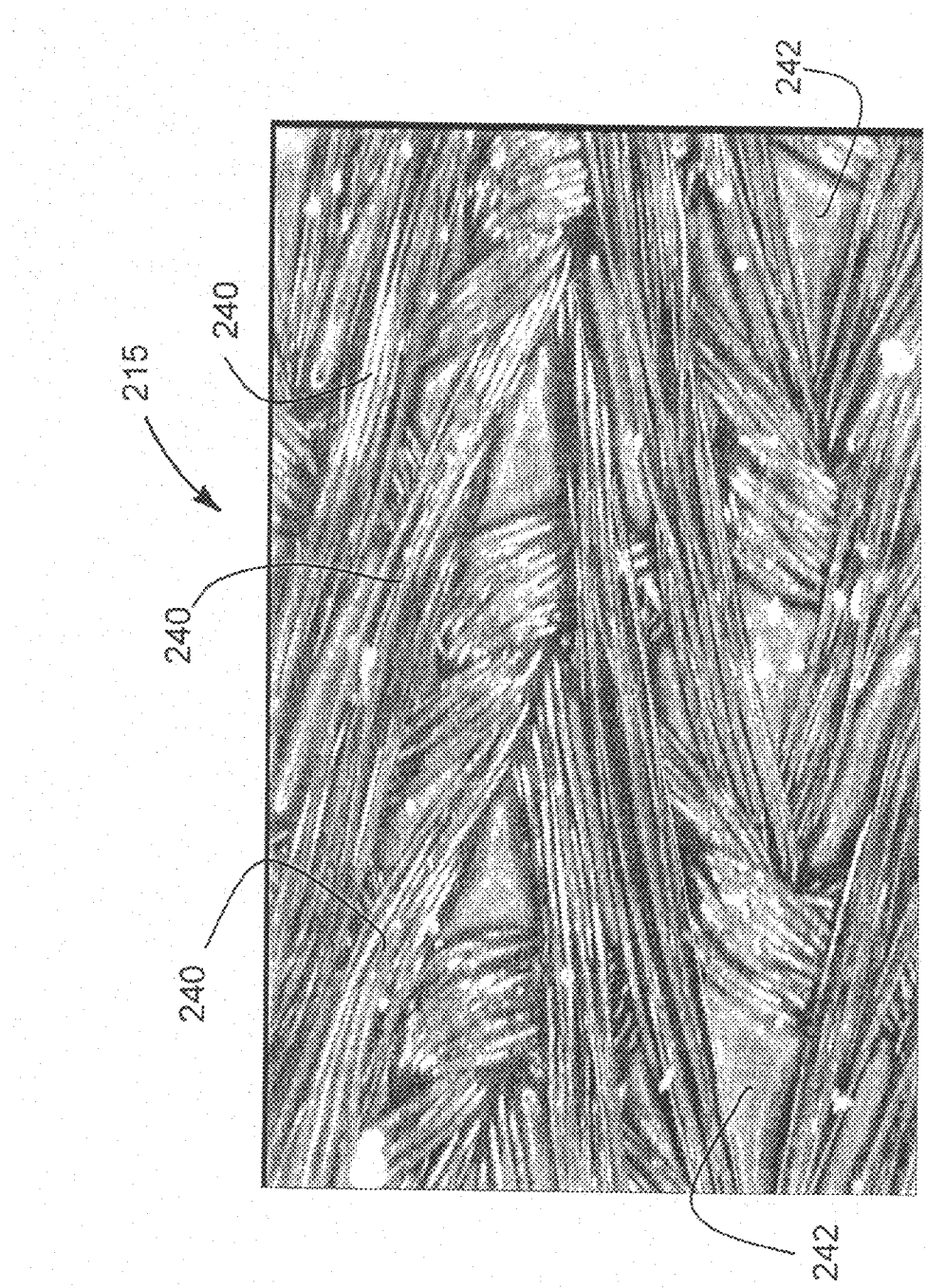
FIG. 11 is another enlarged photograph of the back surface of a fastener product, with a laminated scrim reinforcement.
Figure 12:
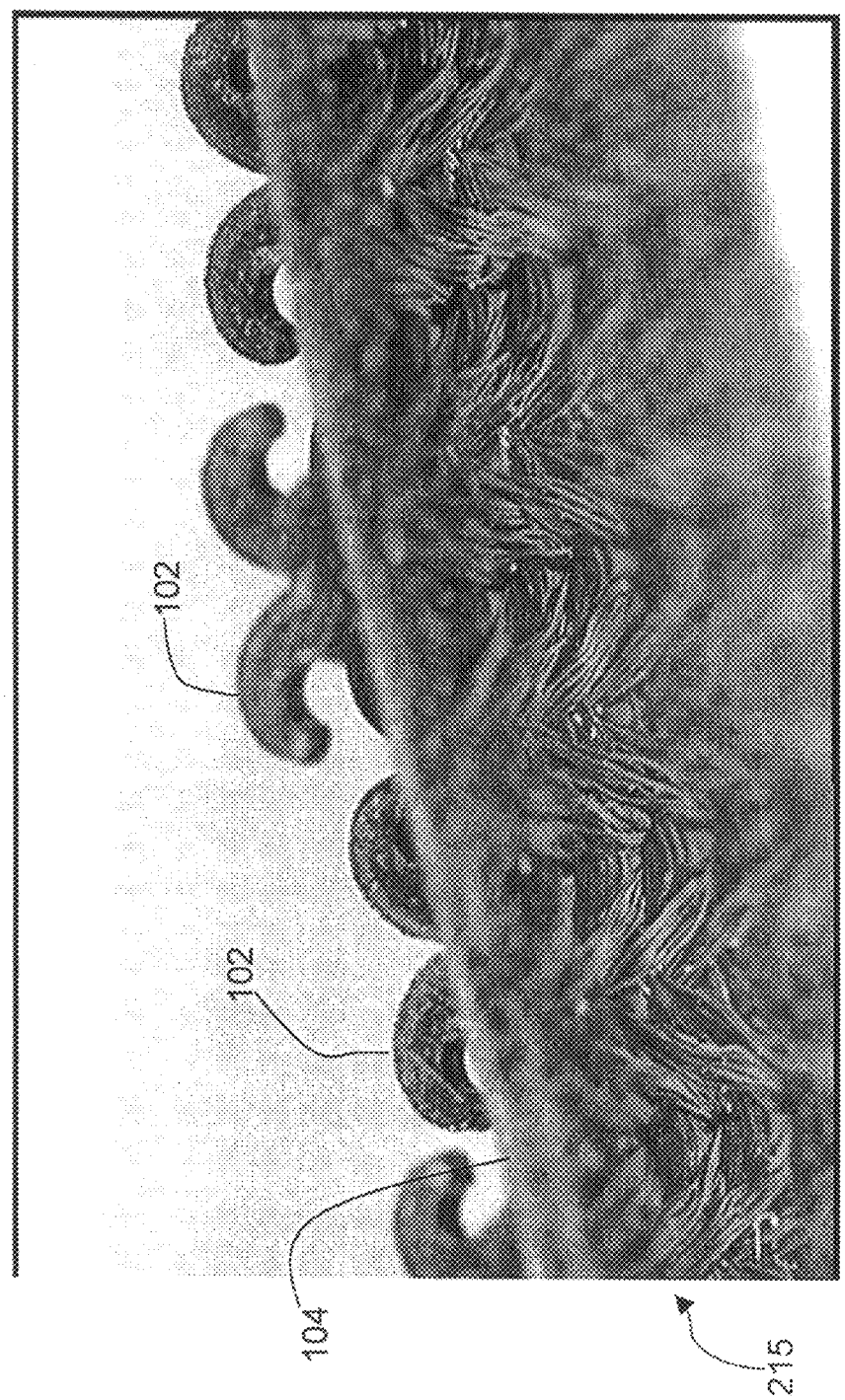
FIG. 12 is a rear perspective view of a reinforced fastener product, showing an edge.

As shown in FIGS. 11 and 12, the float segments 240 are each of multifilament yarns, and define spans generally free of resin 242 from the laminated hook base 104. The float sections tend to extend no more than about 0.17 millimeter from the back surface of the resin base, although the infusion of the resin into the scrim makes the depth of resin vary. As can be seen in the figure, the float sections 240 are much longer than they are high; in other words, they tend to extend only a short distance above the resin and over a rather long span. This low aspect ratio makes them particularly unsuitable for hook engagement, but is believed to increase their utility for tear resistance. FIG. 12 in particular shows the relative spacing of the float pattern with respect to the size of the fastener elements.

The scrim is knitted 160 inches wide and then slit into two 80-inch widths for further processing. Of course, after removal from the knitting machine, the knit tends to relax to a narrower overall width. If the scrim fabric is dyed or washed prior to finishing, the fabric width is substantially reduced due to shrinkage in wet processing and relaxation of the fabric stitch. Dyed fabrics are stretched out in width on a tenter frame approximately 45 percent as they are coated. If scrim is processed without dyeing, such shrinkage and tightening does not occur until the fabric is heated on the tenter frame. The undyed fabric in this case is stretched enough to eliminate wrinkling, and the edges are pinned to the rails on the tenter frame. The fabric passes through the oven and is coated in its pinned state. Shrinkage occurs in the oven, providing further tightening of the fabric. The scrim fabric is preferably stretched sufficiently to eliminate widthwise stretchiness in the width direction. The scrim in this example is stretched to an overall width of about 72 inches.

A stiffening agent or coating is applied to the technical face of the fabric while on the tenter frame in its stretched state. This coating aids in the processing of the fabric during lamination. The coating should be applied so as not to encapsulate the float, bind the float to the ground surface of the fabric, or make the float rigid. The coating may be applied in foam form, in a light application to minimize wicking through to the technical back of the fabric. The foam is preferably applied to the technical face of the product, such as with a parabolic applicator. A useful acrylic binder is Vinamul Duracryl 69A, available from National Starch and Chemical of Bridgewater, N.J. Applying such a binder at a rate of 0.02 to 0.03 pounds per lineal yard has been found to give the fabric sufficient stability during lamination, while not inhibiting bonding to the hook resin. In certain cases where an unstabilized, greige fabric is acceptable, uncoated scrim material may also be used. More details about methods and equipment for stabilizing lightweight fabrics with binders can be found in Shepard et al, U.S. Pat. No. 6,342,285, the contents of which are incorporated herein by reference.

The scrim fabric may be stretched sufficiently in width that the float pile yarns are reoriented to increase the float angle $\psi$ of the exposed float yarn segments with respect to the wale direction. It is believed that this reorientation may improve tear reinforcement properties by helping to absorb energy and/or redirect tear-inducing forces in the final product. It may also be that making the floating stitches more straight and taut as laminated to the resin enables the exposed stitches to bear and redirect potentially tearing loads at much lower resin strains. The arrangement of floating stitch sections forms, in a sense, an external, textile, reinforcing skeleton for the product.

The scrim fabric is preferably laminated to the plastic hook resin with the technical face of the fabric embedded in the resin, or at least bonded to the resin by solidification of the resin in contact with surface features of the fabric, and the unnapped pile float exposed on the backside of the final product and free of the hook resin, such that the floating stitches on the technical back do not become encapsulated in the plastic, but are only held at the ends of the stitch. The central portions of the floating stitches are thus free to reorient to help carry loads that might otherwise cause local resin yielding and lead to tear propagation. The technical face of the fabric provides an effective barrier for the hook resin, keeping the resin from flooding the floats.

Referring back to FIGS. 7 and 8, in some cases the fastener elements are not molded in their final form. In any of the methods disclosed above, for example, the fastener component may be routed through subsequent processing station 230 to finalize the form of the fastener elements. Such subsequent processing may include "flat-topping" overhanging fastener element preforms, as described by Provost, U.S. Pat. No. 5,953,797, and Akeno, U.S. Pat. No. 5,781,969, the disclosure of both of which is hereby incorporated in full by reference. In some cases, even straight molded stems may be subsequently processed to result in fastener elements having the properties disclosed herein. Flat-sided fastener elements with the profiles shown in FIGS. 3 and 5 can also be formed by a cut-and-stretch method, such as the method disclosed in Nestegard, U.S. Pat. No. 4,895,569, for example. In such processes, moldable resin is extruded through a die with openings shaped in the desired hook profile, then the extruded rails are cut transverse to the extrusion direction, and the base stretched in the extrusion direction to separate the rails into rows of discrete fastener elements. This procedure results in fastener elements with broad sides that are cut rather than molded, as in the processes described above, and with profile edges formed by sliding resin through a shaped die rather than a filling cavity.

Figure 13:
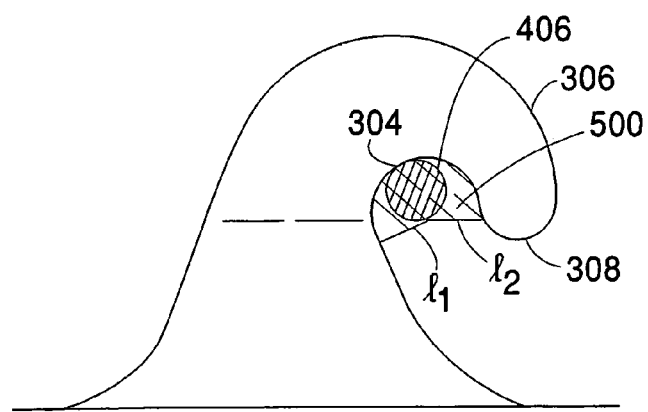
FIG. 13 is a side view of the J-hook fastener element of FIG. 5, illustrating loop confinement area.

Referring next to FIG. 13, the space above line segments $l_1$ and $l_2$ forms a confinement space 500 into which loops 406 are drawn for engagement. The profile area of this confinement space is the area swept by the crook angle. As an engaged loop pulls upward at the apex 304 of the crook, the head 306 of the hook will distend, opening up the confinement area and shifting the orientation of line segment $l_2$ as the hook tip 308 moves upward. Eventually, at the limit of the ability of the hook to retain the loop, the hook distends enough that the loop is released. Because the crook angle is a function of both the extent to which the hook tip curves back toward the stem, and the taper angle of the forward edge of the stem, it is related both to the degree of hook tip displacement required for disengagement under a normal separation load, and to the strength of the stem to resist flexure that would otherwise facilitate such loop release. As both of these factors are related to the amount of normal force required for loop release, crook angle is found to be directly related to the ability of the hook to withstand higher peel loads. In closures that are 'hook limited,' in that the loop strength is stronger than the load required for hook distention, as is typically desirable for high cycle life applications, increasing the hook peel resistance increases the performance of the overall closure.

As a measure of the 'encirclement' of the confinement area by the hook, crook angle is also related to the ability of the hook to resist unintended disengagement of loops at low loads. For very low crook angles, engaged loops can tend to exit the confinement area through the space between tip and base when the load on the loop is reduced or reversed.

Figure 14:
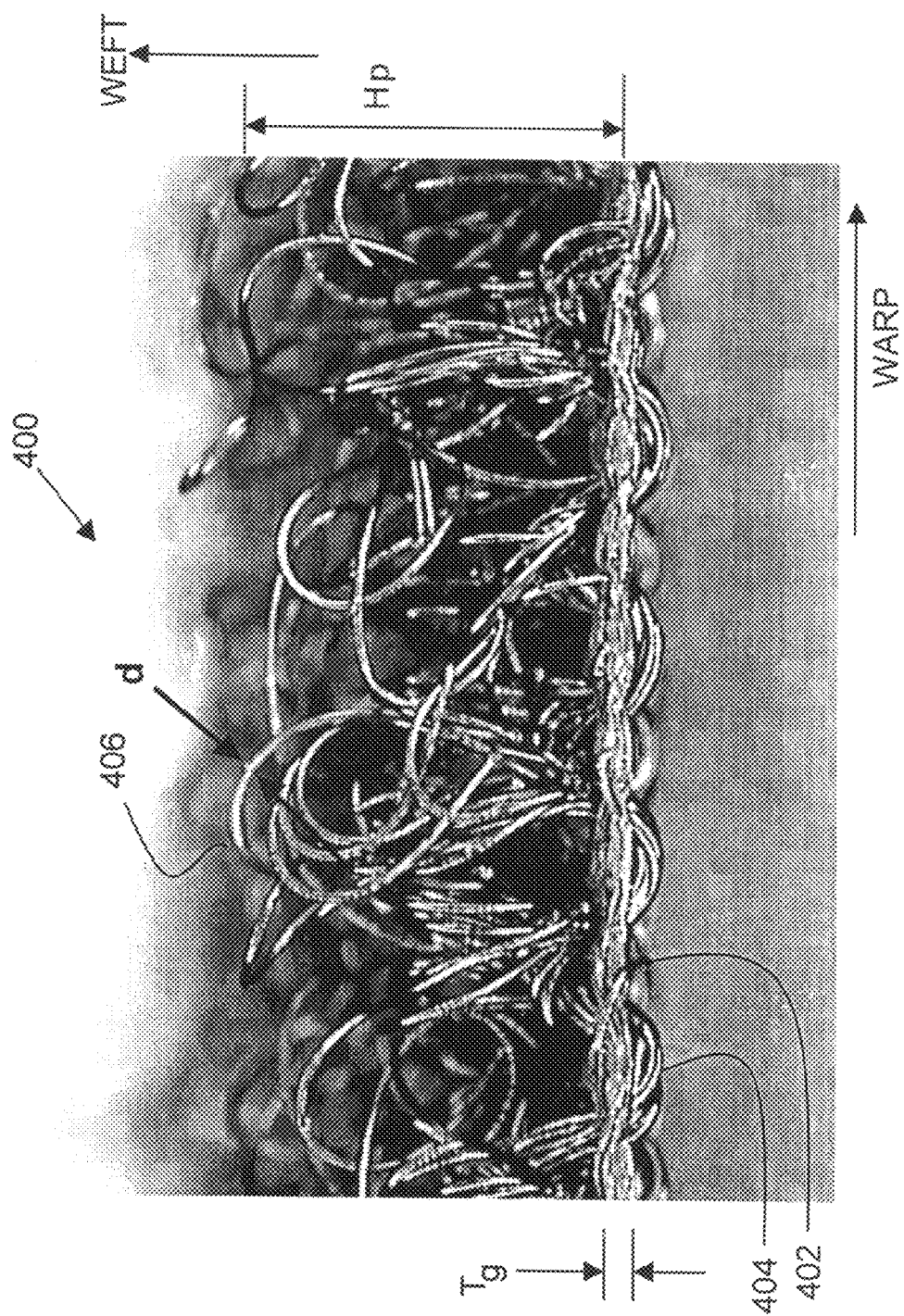
FIG. 14 is an enlarged side view of a woven loop fastener component, looking in the weft direction.
Figure 15:
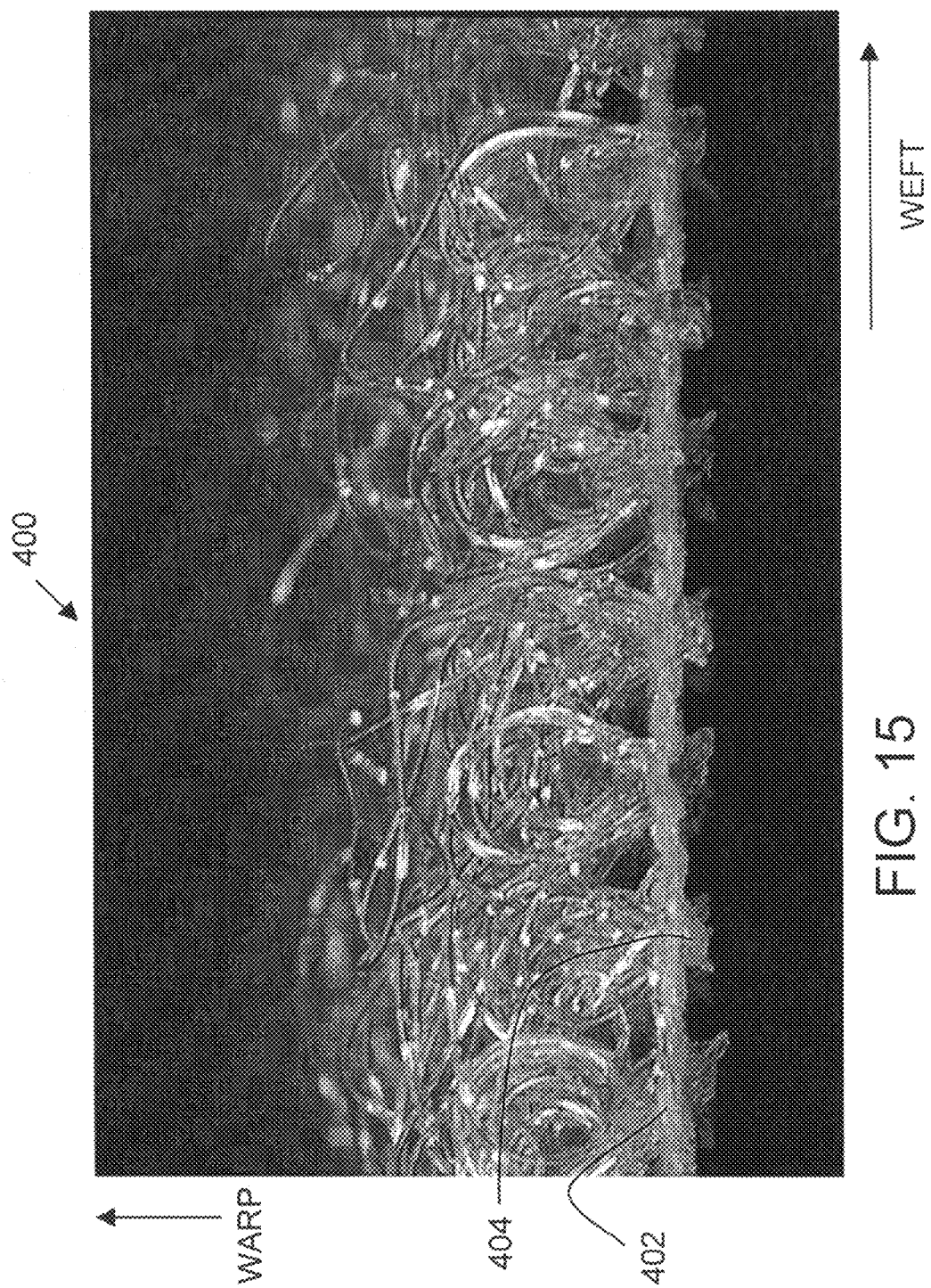
FIG. 15 is an enlarged side view of the loop component of FIG. 14, looking in the warp direction.
Figure 16:
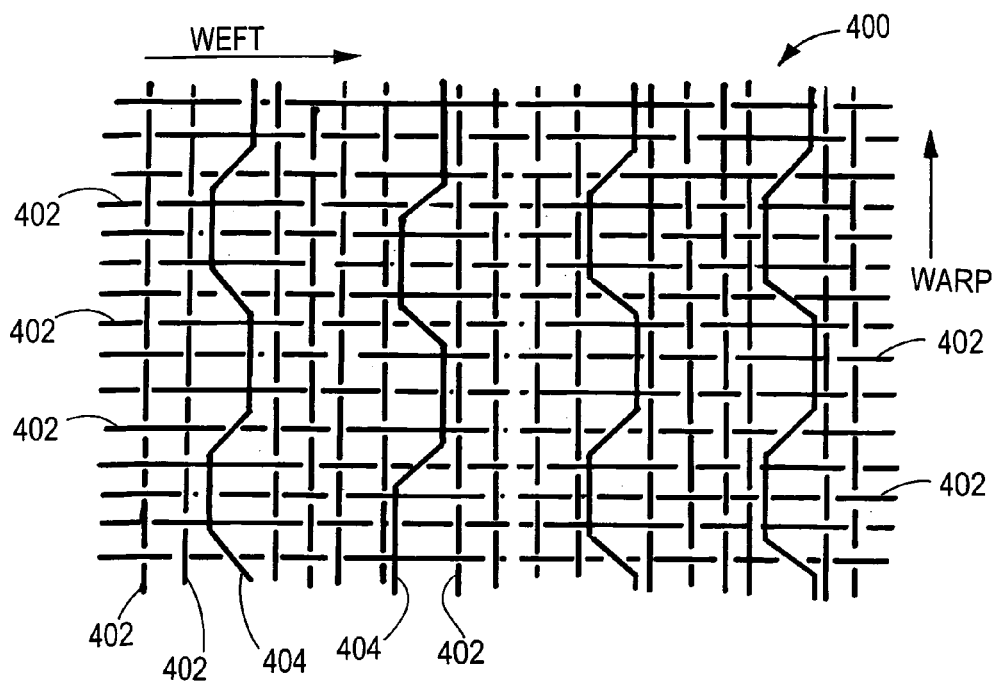
FIG. 16 is an illustration of the weave pattern of the loop component.
Figure 16A:
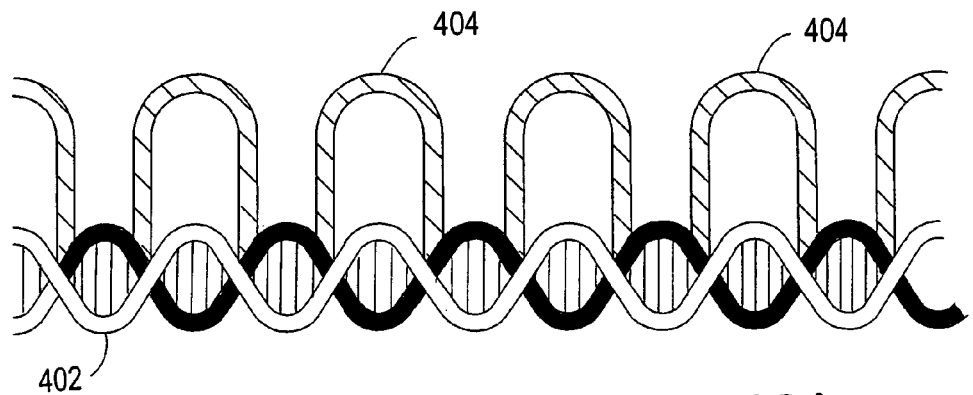
FIG. 16A is a profile illustration of the weave pattern of the loop component.

Referring now to FIGS. 14 to 16, a low profile female touch fastener component 400 is a woven fabric made by interlacing yarns in a first direction, for example, the warp direction with yarns in a second direction, for example the weft direction, the second direction being generally perpendicular to the first direction. The fabric includes a multitude of ground yarns 402 woven with plain weave and interlaced with a pile 404 yarn that forms the loops 406 of the low profile touch fastener component. Interlacing ground yarns 402 and pile yarns 404 in this fashion results in a female fastener component where loops run the length of the fabric in the warp direction and extend across the fabric in the weft direction. Preferably, both the yarns of the pile and the ground are oriented multifilaments. After the fabric is woven, a binder can be sprayed on the back side of the fabric, and then dried or cured to further stabilize the wove product. One example of a binder is a polyacrylic material, applied to have an average dried basis weight of about 37.1 grams of binder per square meter. Another example is a polyurethane binder with an average dried basis weight of about 22.8 grams of binder per square meter.

The ground yarn 402 has a weight of 100 denier in both the warp and weft directions, while the pile yarn 404 has a weight of 280 denier. The ground yarn 402 has a weight range of, for example, from about 70 denier to about 170 denier, while the pile yarn 404 is heavier, with a weight range, for example, from about 160 denier to about 300 denier. The pile yarn filament denier range is, for example, from about 10 denier to about 30 denier. The diameter 'd' of the each pile yarn filament is about 0.002 inch (0.05 millimeter), preferably between about 0.001 and 0.003 inch (0.025 to 0.075 millimeter). The material of both the pile yarn 402 and the ground yarn 404 is nylon, such as nylon 66.

Referring to FIGS. 14 and 16, the ground warp contains 130 yarns/inch (51 yarns/cm). The ground warp range is, for example, from about 122 yarns/inch to about 166 yarns/inch (40 to 65 yarns/cm), including selvedge yarns. The ground weft contains 44 yarns/inch (17 yarns/cm). The ground weft range is, for example, from about 38 yarns/inch to 51 yarns/inch (15 to 20 yarns/cm). The pile warp contains 31 yarns/inch (12 yarns/cm). The pile warp range is, for example, from about 26 yarns/inch to about 36 yarns/inch (10 to 14 yarns/cm), creating an active working body (excluding selvedge yarns) of, for example, from about 291 to about 393 loops per square inch (45 to 60.9 loops/cm$^2$). A ratio of a nominal pile height Hp, measured above the top of the ground, to a nominal ground thickness $T_g$ is, for example, from about 5.0 to about 9.0, measured in unfinished or greige state. The loop material is finished by napping the pile using as is generally known in the art, to detangle the pile and to allow for better engagement. After napping the pile, the ratio of the nominal pile height Hp to a nominal ground thickness $T_g$ is, for example, from about 6.0 to about 9.0.

The low profile female touch fastener component 400 described above has a Gurley Stiffness in the warp direction of about 187 mg, as measured on a 1"×1" sample of the fastener component by "Standard Test Method for Bending Resistance of Paper and Paperboard (Gurley Type Tester)," ASTM D6125-97. The touch fastener component has a greige weight of 220 g/m$^2$, including selvedges.

Referring to FIGS. 17 to 21, a low profile male touch fastener component 420 is a woven fabric made by interlacing yarns in a first direction, for example, the warp direction with yarns in a second direction, for example the weft direction, the second direction being generally perpendicular to the first direction. The fabric includes a multitude of ground yarns 422 woven with plain weave and interlaced with pile yarns 424 which will form the hooks after cutting, such as with an oscillating cutter as known in the art. Interlacing ground yarns 422 and pile yarns 424 in this fashion results in a male fastener component where hooks run the length of the fabric in the warp direction and extend across the fabric in the weft direction. Preferably, the ground yarn is a multifilament yarn, while the pile yarn is a monofilament yarn. After the fabric is woven, a backing is typically placed on the fabric to bond the yarns together. The backing is sprayed as a coating as described above.

The ground yarn 422 in the warp direction has a weight of 100 denier, while the ground yarn 422 has a weight in the weft direction of 70 denier. The ground yarn 422 in both the warp and weft directions has a weight range from about 40 denier to about 140 denier. The pile yarn 424 has a diameter $d_1$ of 0.0085 inch (0.2 mm). The pile yarn diameter $d_1$ is preferably between about 0.0065 and 0.0090 inch (0.16 to 0.23 mm). Preferably, the material of both the pile yarn 422 and the ground yarn 424 is Nylon, such as Nylon 6-6.

Figure 21:
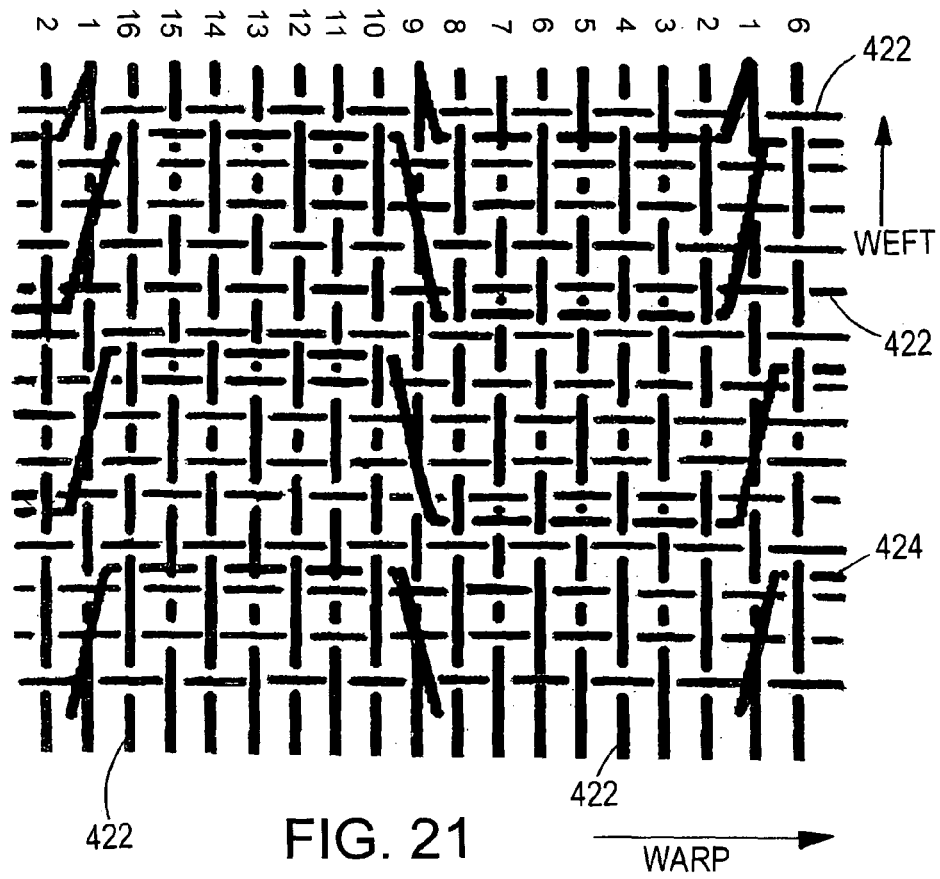
FIG. 21 is an illustration of the weave pattern of the woven hook component.
Figure 21A:
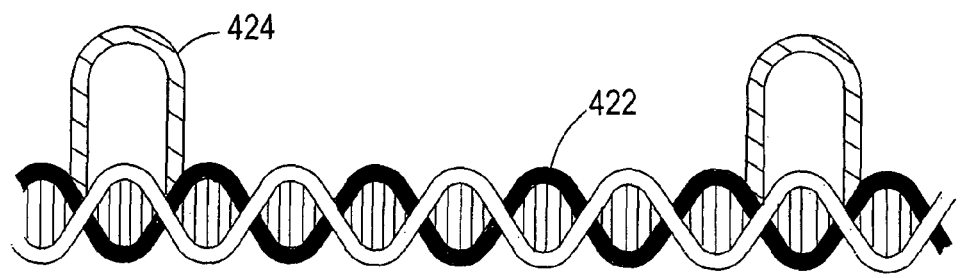
FIG. 21A is a profile illustration of the weave pattern for the woven hook component prior to cutting.

Referring particularly to FIGS. 21 and 21A, the ground warp contains 190 yarns per inch (75 yarns/cm). The ground warp range is preferably from about 162 yarns per inch to about 219 yarns per inch (64 to 86 yarns/cm), including selvedge yarns. The ground weft contains 45 yarns per inch (18 yarns/cm). The ground weft is preferably between about 38 and 52 yarns per inch (15 to 20 yarns/cm). The pile warp is 38 yarns per inch (15 yarns/cm). The pile warp is preferably between about 32 and 44 yarns per inch (13 to 17 yarns/cm). The working body contains 405 hooks per square inch (63 hooks/cm$^2$). The working body hook density is preferably from about 344 to 465 hooks per square inch (53 to 72 hooks/cm$^2$). Referring back to FIG. 13, the ratio of nominal hook height H, measured above the top of the ground, to nominal ground thickness $T_{g1}$ is 4.8, measured in an unfinished or greige state. The range of the ratio of H to $T_{g1}$ is preferably from about 4.1 to about 4.8, measured in an unfinished or greige state. The nominal ground thickness is, in this example, about 0.007 inch (0.18 mm). The male touch fastener component has a Gurley Stiffness in the warp direction of about 511 mg and a greige basis weight of about 180 grams per square meter, including selvedges in a two-inch working width.

Another embodiment is produced as described above, but with a warp ground weight of 70 denier, a weft ground weight of 40 denier and a pile yarn diameter of 0.008 inch (0.203 mm). The ground warp contains about 190 yarns per inch (78 yarns/cm). The ground weft contains about 76 yarns per inch (30 yarns/cm). The pile contains 38 yarns per inch (15 yarns/cm). The pile yarn is interlaced to produce a product having a ratio of H to $T_{g1}$ of 6.1. The male touch fastener component has a Gurley Stiffness in the warp direction of about 145 mg, making it more flexible than the example described above.

Referring back to FIGS. 19 and 19A, pile yarn 424 penetrates upwardly through the woven ground, forms an apex 426, and then penetrates downwardly through the woven ground further along the warp direction. Penetration of pile yarn 424 upwardly through the woven ground, and then penetration downwardly through the woven ground, creates a pair of legs 430. The distance 'D' along a line between the centers of each leg in the plane of the upper surface of the ground is preferably between about 0.027 inch and 0.035 inch (0.69 to 0.89 mm). The average height H of the hooks is about 0.05 inch (1.27 mm), resulting in a stance ratio D/H of about 0.6. The hooks are spaced apart across the width of the fabric, with a distance between adjacent hooks being about 1.38 to 1.42 millimeters.

Figure 19:
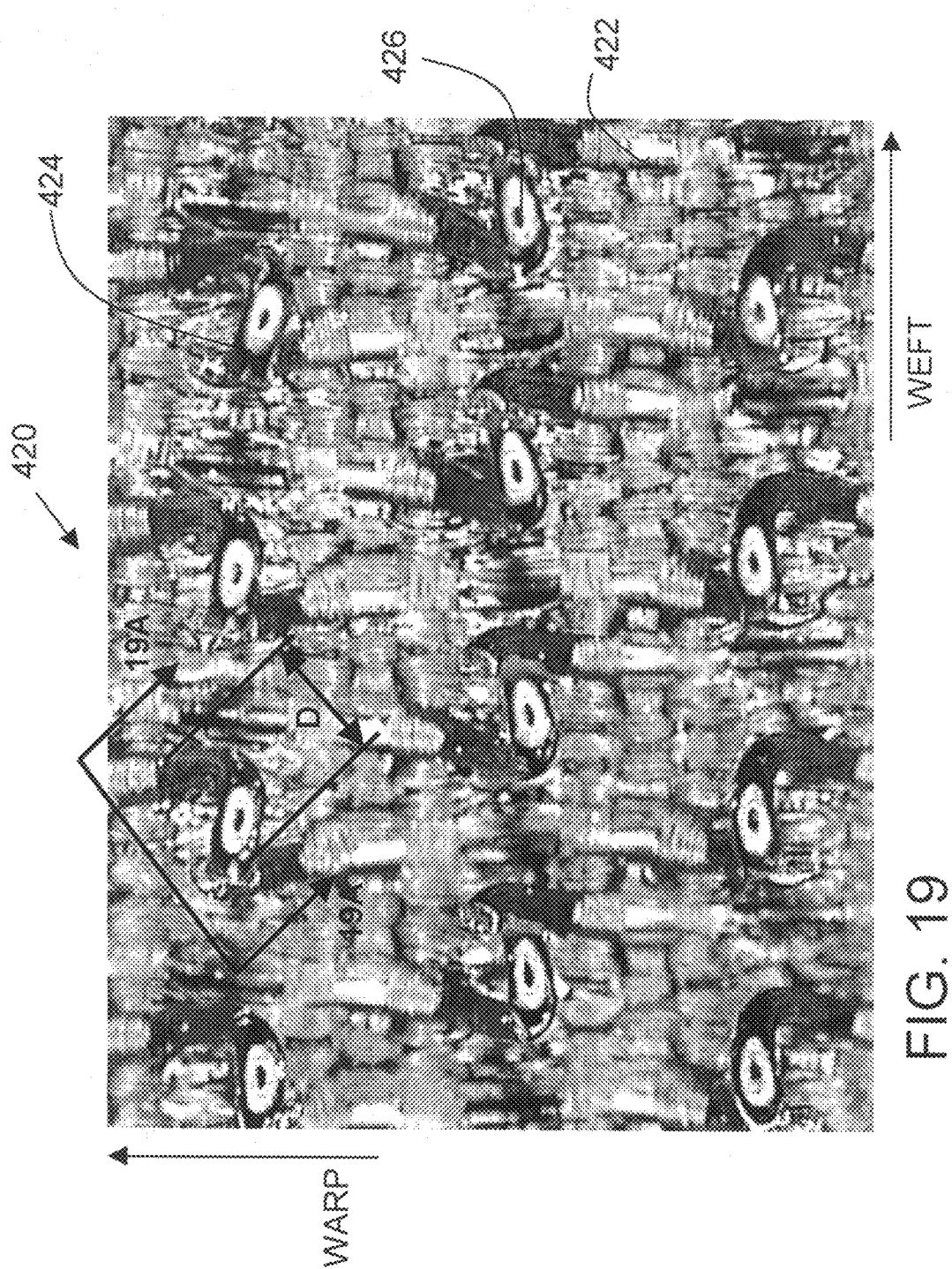
FIG. 19 is a top view of the woven hook component.
Figure 19A:
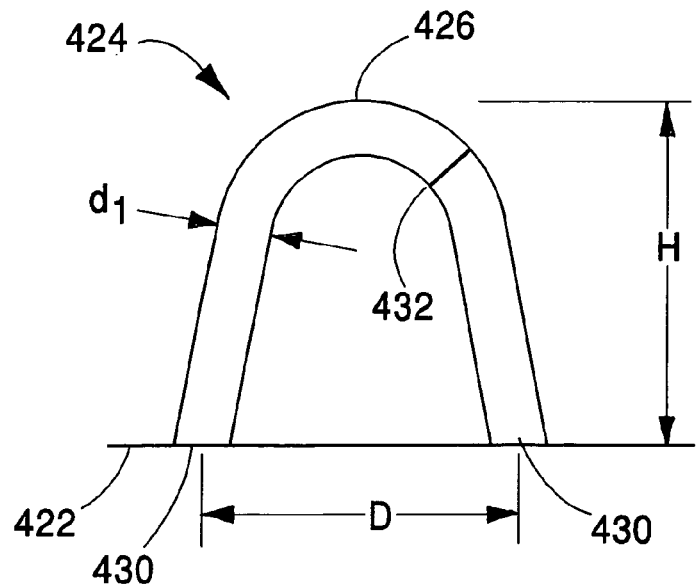
FIG. 19A is a view taken along line 19A-19A of FIG. 19.
Figure 20:
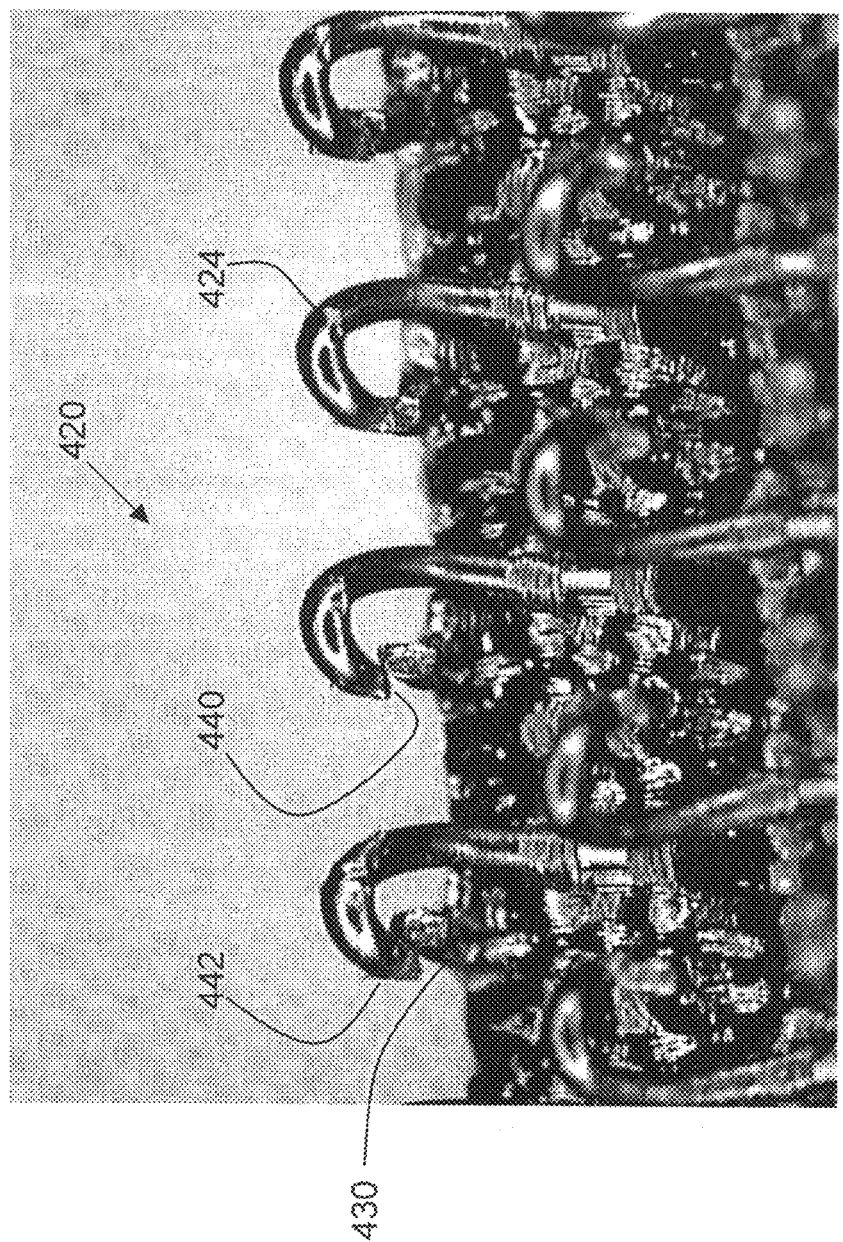
FIG. 20 is a perspective view of the woven hook component, with the ground of the hook component curved.

Referring to FIGS. 19 and 20, legs 430 are not in a straight line in the warp direction, but are offset. This causes built-in stress in the monofilament pile so that when the monofilament loop is cut to form a hook, the distal end of the hook 440 'springs' away from the severed leg below, forming a space 440 through which a loop may pass to engage the hook.

Figure 17:
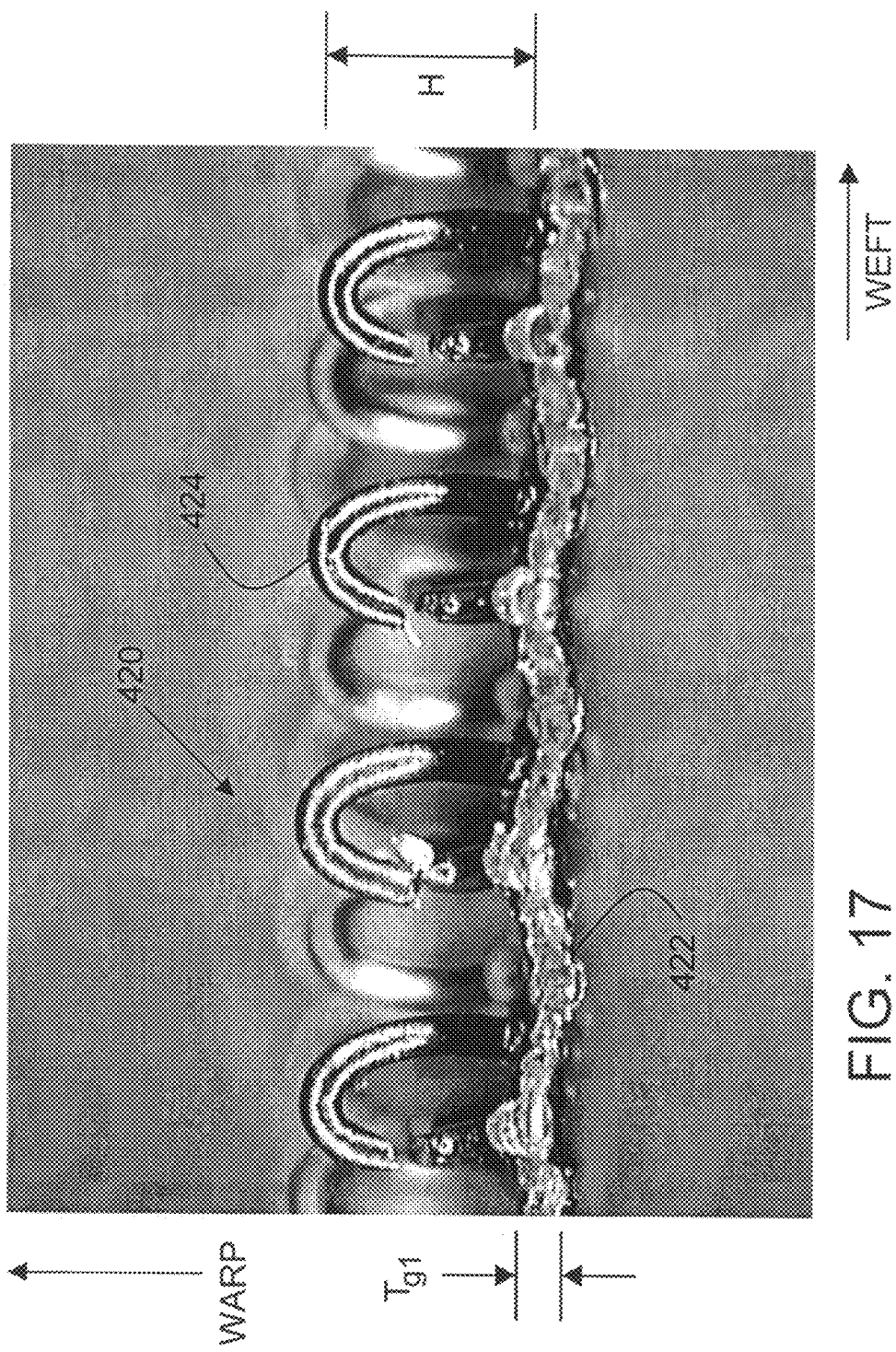
FIG. 17 is an enlarged side view of a woven hook fastener component, looking in the warp direction.
Figure 18:
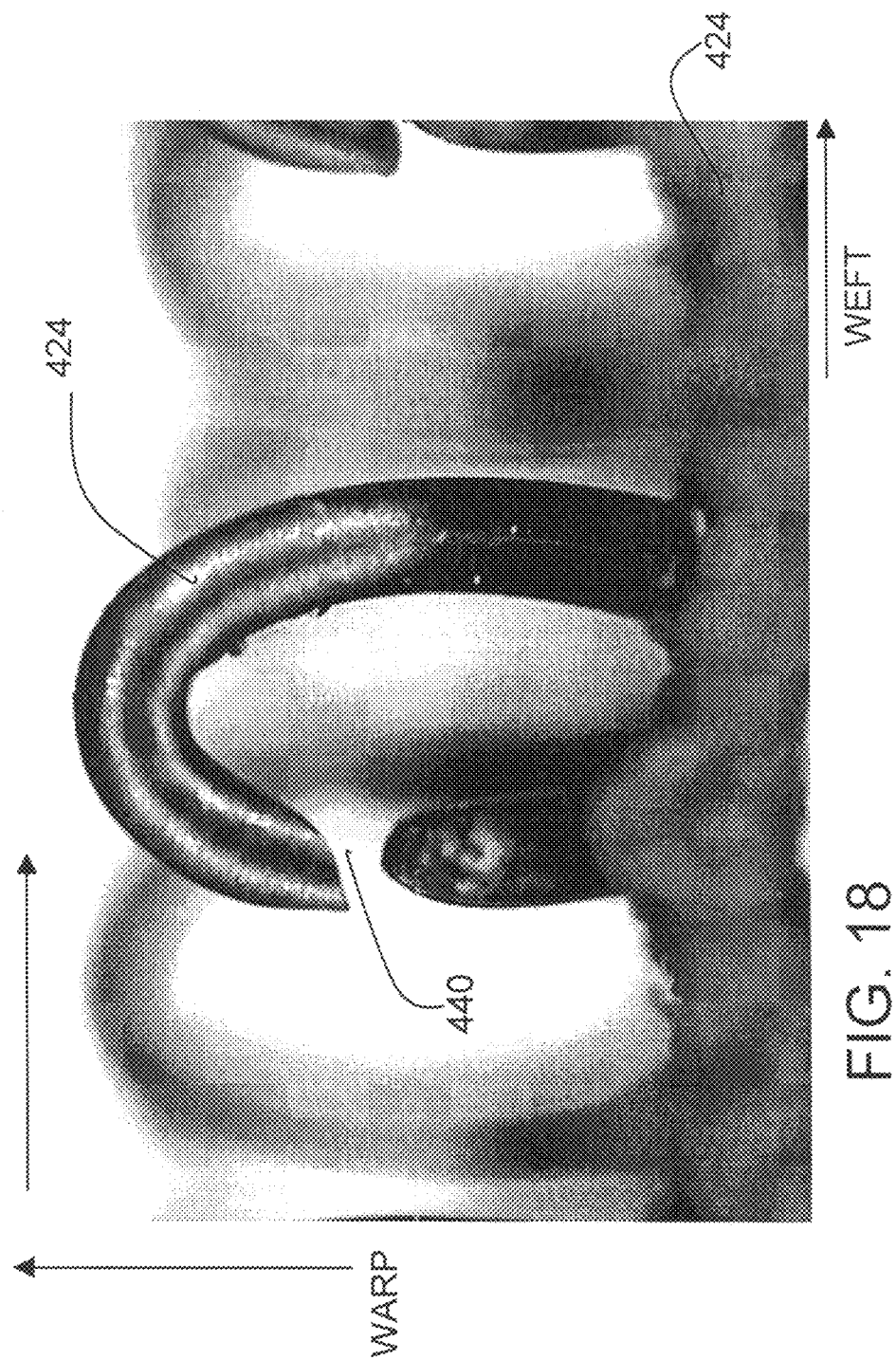
FIG. 18 is a magnified view of one of the hooks of the woven hook component.

Further details of the embodiments of FIGS. 14 and 17 can be found in an application entitled "WOVEN TOUCH FASTENER PRODUCTS," filed concurrently herewith and assigned U.S. Ser. No. 10/688,033, the disclosure of which is hereby incorporated in full by reference.

Figure 22:
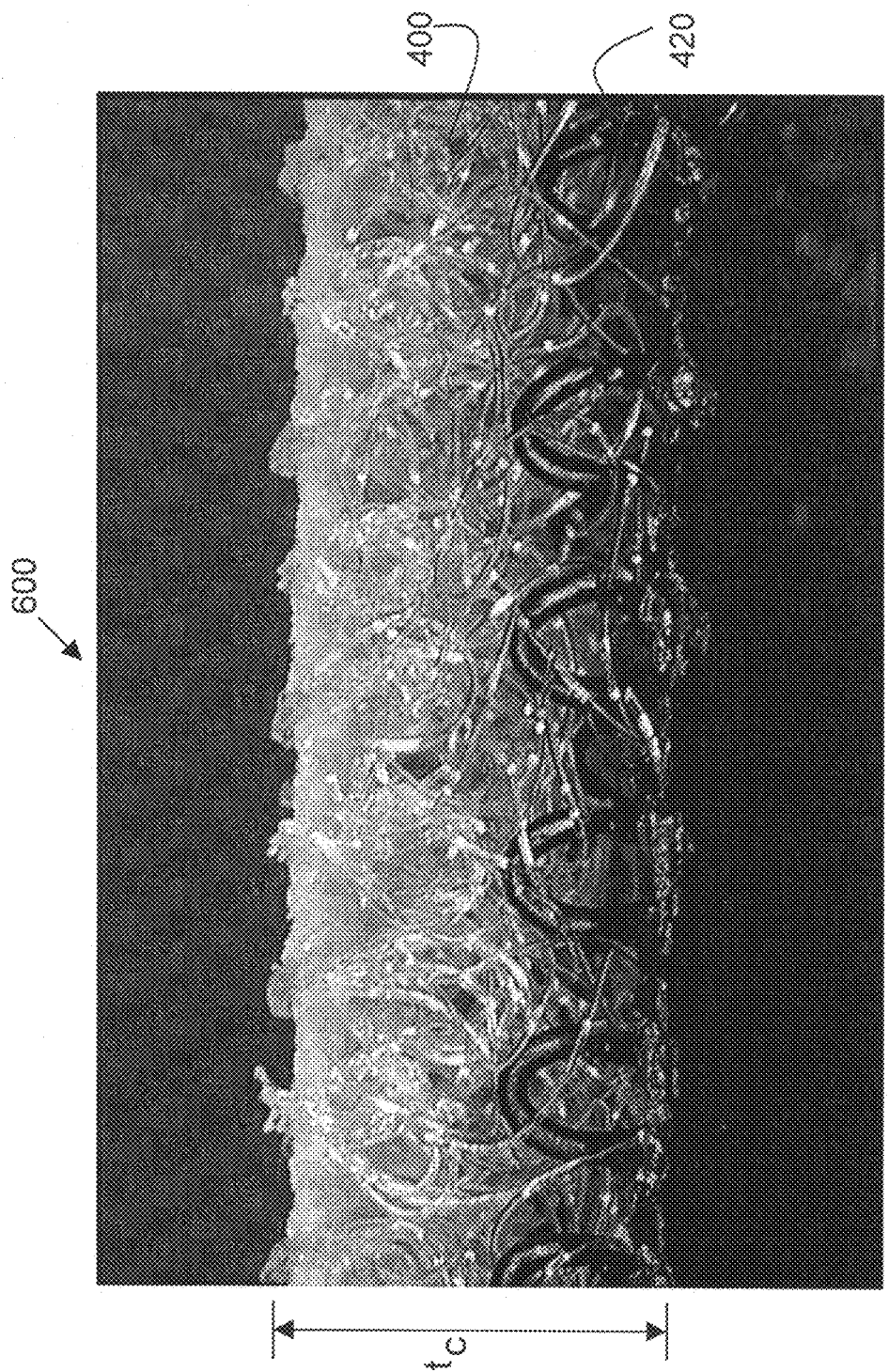
FIG. 22 is an enlarged side view of the loop material of FIG. 14 engaged with the hook material of FIG. 17.

The overall closure 600 shown in FIG. 22 includes the hook component 420 of FIG. 17 mated with the loop component 400 of FIG. 14. The overall closure has an Engaged Thickness $t_c$, as measured by the test procedure outlined below, of about 0.094 inch (2.4 millimeters). Tests of samples of this closure exhibited an Initial Peel Resistance, as measured by the test procedure outlined below, of about 0.88 pounds per inch of width, and a Final Peel Resistance of about 0.56 pounds per inch of width. Tests of samples of this closure also exhibited an Initial Shear Resistance, as measured by the test procedure outlined below, of about 11.7 pounds per square inch. The loop component 400 and hook component 420 separately exhibited Stitch Hole Tear Strength, as measured by the test procedure outlined below, of about 5.5 and 2.1 pounds, respectively.

Figure 23:
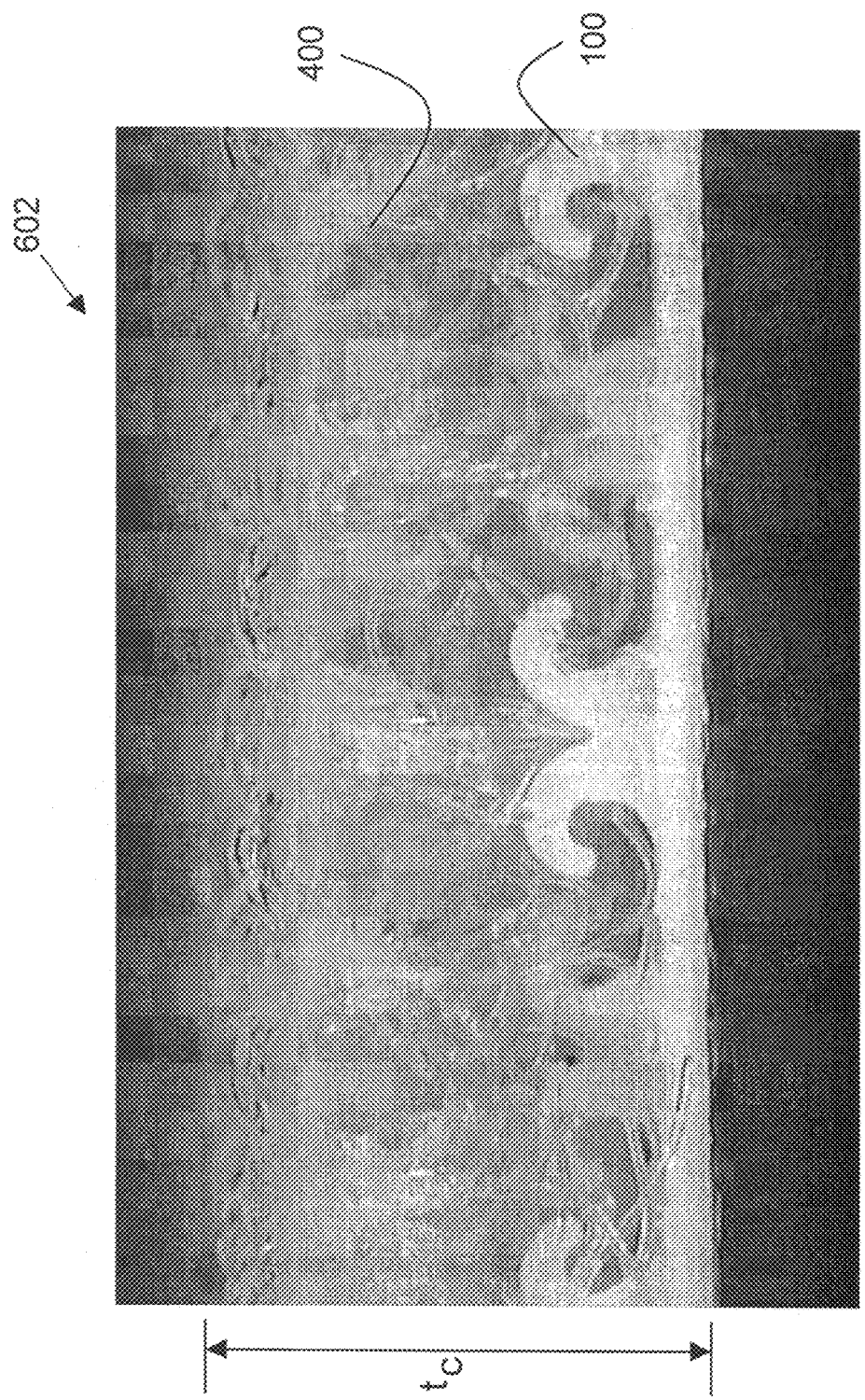
FIG. 23 is an enlarged side view of the loop material of FIG. 14 engaged with the hook material of FIG. 1.

The overall closure 602 shown in FIG. 23 includes the hook component 100 of FIG. 1 mated with the loop component 400 of FIG. 14. The overall closure has an Engaged Thickness $t_c$, as measured by the test procedure outlined below, of about 0.085 inch (2.2 millimeters). Tests of samples of this closure exhibited an Initial Peel Resistance, as measured by the test procedure outlined below, of about 0.69 pounds per inch of width, and a Final Peel Resistance of about 0.33 pounds per inch of width. Tests of samples of this closure also exhibited an Initial Shear Resistance, as measured by the test procedures outlined below, of about 30.0 pounds per square inch. The hook component 100 of FIG. 1, molded from nylon while being laminated (as in FIG. 7) to the scrim material discussed above with respect to FIG. 9, exhibited a Stitch Hole Tear Strength, as measured by the test procedure outlined below, of about 5.7 pounds.

Test Methods

Figure 24:
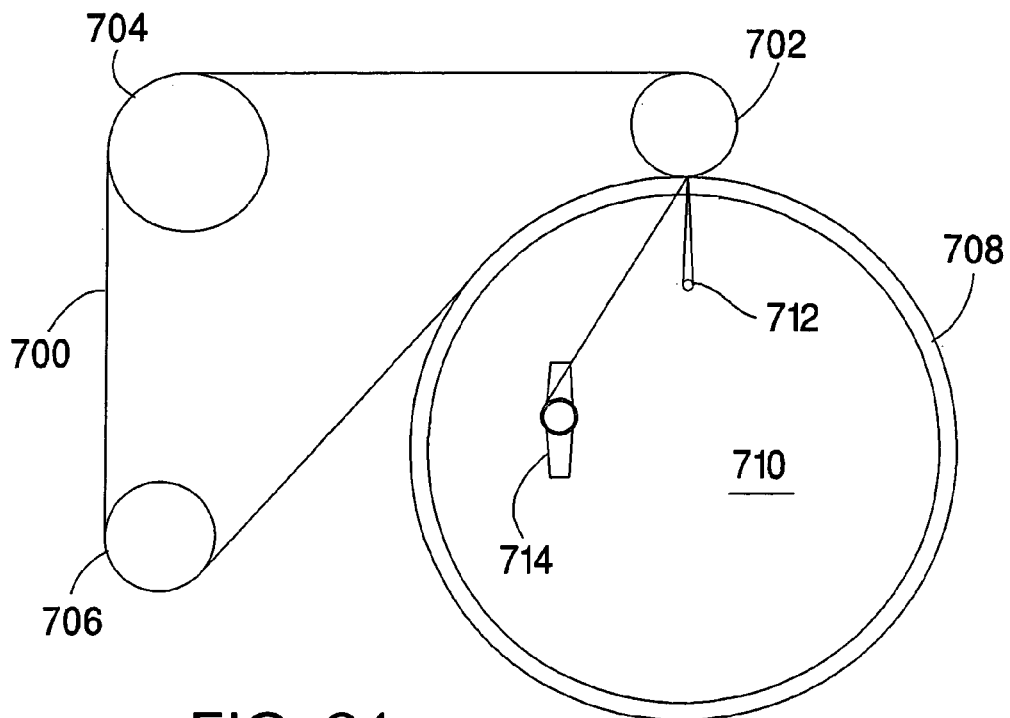
FIG. 24 illustrates a test fixture for cycling touch fastener material through multiple simulated openings and closings.

Peel resistance of the engaged closure is determined in accordance with ASTM D5170-98, employing the integrator average option for calculation. This standard measure is understood to be generally related to the ability of the engaged fastener to resist normal disengagement loads that are applied initially at one edge of the closure, and propagate across the closure as the two fastener components are separated, such as when the closure is peeled open. "Initial Peel Resistance" is measured on new specimens, while "Final Peel Resistance" is measured on samples previously cycled through 1000 engagements and disengagements performed in accordance with Sequence (1) of FIG. 2 of ASTM D5170-98, employing the repetitive closure cycling apparatus shown in FIG. 24. For such repetitive closure cycling, a 40-inch long hook tape is formed into an endless belt 700, such as by ultrasonically welding the ends of the tape together. The hook tape is wrapped about the applicator roll 702, the tension roll 704, and the peel angle adjustment roll 706, as shown. A fifty-five inch length 708 of the loop tape is secured to the outer surface of the drum 710 and tensioned to prevent the tape from moving on the drum surface during testing. One end of the loop tape is fashioned into a loop and secured to an attachment hook 712 on the drum. The other end of the loop tape is attached to a tensioner 714. The arrangement of the rolls and drum is such that the hook and loop tapes are continuously disengaged with a peel angle of about 135 degrees. With the drum turning at a rate of 16 revolutions per minute, and the applicator roll loading the engaging tapes with a load of 11 pounds per inch of tape width, the drum is turned through a total of 1000 revolutions, such that each segment of the hook and loop tapes has been cycled through 1000 peel cycles. Following cycling, the hook and loop tapes are separated by hand and then conditioned in accordance with Section 7 of ASTM D5170-98 before being cut into samples for peel testing.

"Initial Shear Resistance" of the engaged closure is determined in accordance with ASTM D5169-98. This standard measure is understood to be generally related to the ability of the engaged fastener to resist loads applied within the plane of the fastener, as can be generated by loads applied through the materials the closure is connecting. Touch fasteners are typically stronger in shear loading than in peel loading.

"Engaged Thickness" is a measurement of the overall thickness of the engaged closure, prepared according to paragraphs 6.1 through 8.23 of ASTM D5170-98, and then engaged according to paragraph 8.24 of ASTM D5170-98, except that the roller is pushed across the closure in only one direction, for one pass, constituting one-half of a cycle. Engaged Thickness is then measured with the closure in an unloaded state, such as by optical measurement viewing the closure from its longer edge. Thus, the thickness measurement is made following initial engagement under static load of one-half pound per square inch for two seconds and one rolling load of 11 pounds per inch of closure width.

"Stitch Hole Tear Strength" is measured according to the following test method, on un-engaged fastener components. A line of holes is made along the center of width of each eight-inch by one-inch test sample, with a 0.044 inch, medium ball needle, at a stitch rate of 11 to 13 stitch holes per inch, without thread, starting around three inches from a first end of the sample. The sample is then conditioned for at least 20 hours at 69.8 to 77 degrees Fahrenheit and 45 to 55 percent relative humidity. A straight line is cut from the first end of the sample to the nearest hole, forming two separate tabs. The sample is then held by the tabs and torn by moving the two tabs apart by motion within the plane of the sample and perpendicular to the line of holes, at a separation speed of 11.5 to 12.5 inches per minute, until the sample exhibits a total tear length of about five inches. Disregarding data from the first and last 12-second period of the loading, the five highest load peaks are averaged and reported to the nearest 0.1 pound increment.

A number of embodiments of the invention have been described. Nevertheless, it will be understood that various modifications may be made without departing from the spirit and scope of the invention. Accordingly, other embodiments are within the scope of the following claims.

What is claimed is:

1. A releasable touch fastener comprising
a loop component having a sheet-form loop base and an array of female fastener elements extending from the loop base; and
a hook component having a sheet-form hook base and an array of male fastener elements extending from the base and configured to releasably engage the female fastener elements of the loop component;
wherein the touch fastener has an Engaged Thickness of less than about 0.11 inch, and
wherein the hook and loop components are so configured to provide a Final Peel Resistance of at least 0.3 pound per inch of closure width.

2. The releasable touch fastener of claim 1 wherein the hook and loop components are so configured to provide an Initial Peel Resistance of at least 0.5 pound per inch of closure width.

3. The releasable touch fastener of claim 1 wherein the hook and loop components are so configured to provide an Initial Shear Resistance of at least 10 pounds per square inch.

4. The releasable touch fastener of claim 1 wherein the hook component has a Stitch Hole Tear Strength of at least 2.0 pounds.

5. The releasable touch fastener of claim 4 wherein the hook base comprises a sheet of resin and the male fastener elements have stems extending contiguously from the sheet of resin, and wherein the Stitch Hole Tear Strength is at least 5.0 pounds.

6. The releasable touch fastener of claim 5 wherein the hook base includes a fabric backing laminated to a side of the hook base opposite the fastener elements.

7. The, releasable touch fastener of claim 1 wherein the hook base comprises a sheet of resin, and wherein the male fastener elements have stems extending contiguously from the sheet of resin.

8. The releasable touch fastener of claim 7 wherein the male fastener elements have molded crooks.

9. The releasable touch fastener of claim 8 wherein each male fastener element has two crooks extending in opposite directions along the hook base.

10. The releasable touch fastener of claim 7 wherein the fastener elements are arranged in a density of at least 350 fastener elements per square inch of the base.

11. The releasable touch fastener of claim 7 wherein the stems have opposing surfaces defined by severed resin.

12. The releasable touch fastener of claim 1 wherein the loop component comprises a woven fabric.

13. The releasable touch fastener of claim 12 wherein the hook base comprises a sheet of resin, and wherein the male fastener elements have stems extending contiguously from the sheet of resin.

14. The releasable touch fastener of claim 1 wherein the Engaged Thickness is less than 0.10 inch.

15. The releasable touch fastener of claim 14 wherein the Engaged Thickness is less than 0.09 inch.

16. The releasable touch fastener of claim 15 wherein the Engaged Thickness is less than 0.08 inch.

17. The releasable touch fastener of claim 1 wherein the Final Peel Resistance is at least 0.4 pound per inch of closure width.

18. The releasable touch fastener of claim 17 wherein the Final Peel Resistance is at least 0.5 pound per inch of closure width.

19. A releasable touch fastener comprising
   a loop component having a sheet-form loop base and an array of female fastener elements extending from the loop base; and
   a hook component having a sheet-form hook base and an array of male fastener elements extending from the base and configured to releasably engage the female fastener elements of the loop component;
   wherein the touch fastener has an Engaged Thickness of less than about 0.11 inch, and
   wherein the male and female fastener elements are so configured to provide an Initial Peel Resistance of at least 0.5 pounds per inch of closure width.

20. The releasable touch fastener of claim 19 wherein the hook and loop components are so configured to provide an Initial Shear Resistance of at least 10 pounds per square inch.

21. The releasable touch fastener of claim 19 wherein the hook component has a Stitch Hole Tear Strength of at least 2.0 pounds.

22. The releasable touch fastener of claim 21 wherein the hook base comprises a sheet of resin and the male fastener elements have stems extending contiguously from the sheet of resin, and wherein the Stitch Hole Tear Strength is at least 5.0 pounds.

23. The releasable touch fastener of claim 22 wherein the hook base includes a fabric backing laminated to a side of the hook base opposite the fastener elements.

24. The releasable touch fastener of claim 19 wherein the hook base comprises a sheet of resin, and wherein the male fastener elements have stems extending contiguously from the sheet of resin.

25. The releasable touch fastener of claim 24 wherein the male fastener elements have molded crooks.

26. The releasable touch fastener of claim 24 wherein each male fastener element has two crooks extending in opposite directions along the hook base.

27. The releasable touch fastener of claim 24 wherein the fastener elements are arranged in a density of at least 350 fastener elements per square inch of the base.

28. The releasable touch fastener of claim 24 wherein the stems have opposing surfaces defined by severed resin.

29. The releasable touch fastener of claim 19 wherein the loop component comprises a woven fabric.

30. The releasable touch fastener of claim 29 wherein the hook base comprises a sheet of resin, and wherein the male fastener elements have stems extending contiguously from the sheet of resin.

31. The releasable touch fastener of claim 19 wherein the Engaged Thickness is less than 0.10 inch.

32. The releasable touch fastener of claim 31 wherein the Engaged Thickness is less than 0.09 inch.

33. The releasable touch fastener of claim 32 wherein the Engaged Thickness is less than 0.08 inch.

34. The releasable touch fastener of claim 19 wherein the Initial Peel Resistance is at least 0.6 pound per inch of closure width.

35. The releasable touch fastener of claim 34 wherein the Initial Peel Resistance is at least 0.69 pound per inch of closure width.

36. The releasable touch fastener of claim 35 wherein the Initial Peel Resistance is at least 0.8 pound per inch of closure width.

37. A releasable touch fastener comprising
   a loop component having a sheet-form loop base and an array of female fastener elements extending from the loop base; and
   a hook component having a sheet-form hook base and an array of male fastener elements extending from the base and configured to releasably engage the female fastener elements of the loop component;
   wherein the touch fastener has an Engaged Thickness of less than about 0.11 inch, and
   wherein the male and female fastener elements are so configured to provide an Initial Shear Resistance of at least 10 pounds per square inch.

38. The releasable touch fastener of claim 37 wherein the hook component has a Stitch Hole Tear Strength of at least 2.0 pounds.

39. The releasable touch fastener of claim 38 wherein the hook base comprises a sheet of resin and the male fastener elements have stems extending contiguously from the sheet of resin, and wherein the Stitch Hole Tear Strength is at least 5.0 pounds.

40. The releasable touch fastener of claim 39 wherein the hook base includes a fabric backing laminated to a side of the hook base opposite the fastener elements.

41. The releasable touch fastener of claim 37 wherein the hook base comprises a sheet of resin, and wherein the male fastener elements have stems extending contiguously from the sheet of resin.

42. The releasable touch fastener of claim 41 wherein the male fastener elements have molded crooks.

43. The releasable touch fastener of claim 41 wherein each male fastener element has two crooks extending in opposite directions along the hook base.

44. The releasable touch fastener of claim 41 wherein the fastener elements are arranged in a density of at least 350 fastener elements per square inch of the base.

45. The releasable touch fastener of claim 41 wherein the stems have opposing surfaces defined by severed resin.

46. The releasable touch fastener of claim 37 wherein the loop component comprises a woven fabric.

47. The releasable touch fastener of claim 46 wherein the hook base comprises a sheet of resin, and wherein the male fastener elements have stems extending contiguously from the sheet of resin.

48. The releasable touch fastener of claim 37 wherein the Engaged Thickness is less than 0.10 inch.

49. The releasable touch fastener of claim 48 wherein the Engaged Thickness is less than 0.09 inch.

50. The releasable touch fastener of claim 49 wherein the Engaged Thickness is less than 0.08 inch.

51. The releasable touch fastener of claim 37 wherein the Initial Shear Resistance is at least 15 pounds per square inch.

52. The releasable touch fastener of claim 51 wherein the Initial Shear Resistance is at least 20 pounds per square inch.

53. The releasable touch fastener of claim 52 wherein the Initial Shear Resistance is at least 25 pounds per square inch.

* * * * *